(12) United States Patent
Rinne et al.

(10) Patent No.: US 7,454,210 B2
(45) Date of Patent: Nov. 18, 2008

(54) CONTROL OF RADIO COMMUNICATION NETWORK HAVING PLURAL RADIO NETWORK CONTROLLERS INCLUDING AN ANCHOR CONTROLLER

(75) Inventors: Mika Rinne, Espoo (FI); Lauri Laitinen, Espoo (FI)

(73) Assignee: Nokia Corporation, Espoo (FI)

( * ) Notice: Subject to any disclaimer, the term of this patent is extended or adjusted under 35 U.S.C. 154(b) by 599 days.

(21) Appl. No.: 10/407,289

(22) Filed: Apr. 4, 2003

(65) Prior Publication Data
US 2003/0190915 A1 Oct. 9, 2003

Related U.S. Application Data

(63) Continuation of application No. 09/075,158, filed on May 8, 1998, now Pat. No. 6,574,473.

(30) Foreign Application Priority Data
Aug. 20, 1997 (FI) .................................... 973425

(51) Int. Cl.
*H04Q 7/20* (2006.01)
(52) U.S. Cl. ................... 455/442; 455/560; 455/561
(58) Field of Classification Search ................. 455/436, 455/438, 444, 445, 560, 561, 442
See application file for complete search history.

(56) References Cited

U.S. PATENT DOCUMENTS

| | | | |
|---|---|---|---|
| 5,345,448 A | 9/1994 | Keskitalo | 370/95.3 |
| 5,410,733 A | 4/1995 | Niva et al. | 455/33.2 |
| 5,483,668 A | 1/1996 | Malkamaki et al. | 455/33.2 |
| 5,524,009 A | 6/1996 | Tuutijarvi et al. | 370/95.3 |
| 5,577,022 A | 11/1996 | Padovani et al. | 370/13 |
| 5,577,047 A | 11/1996 | Persson et al. | 370/95.3 |
| 5,659,598 A | 8/1997 | Byrne et al. | 455/436 |
| 5,663,957 A | 9/1997 | Dent | 370/347 |
| 5,710,974 A | 1/1998 | Granlund et al. | 455/33.2 |
| 5,754,537 A | 5/1998 | Jamal | 370/330 |
| 5,761,195 A | 6/1998 | Lu et al. | 370/329 |
| 5,812,951 A | 9/1998 | Ganesan et al. | 455/445 |
| 5,850,607 A | 12/1998 | Muszynski | 455/442 |
| 5,966,659 A | 10/1999 | McDonald et al. | 455/445 |
| 6,009,326 A | 12/1999 | Roder et al. | 455/436 |
| 6,574,473 B2 * | 6/2003 | Rinne et al. | 455/436 |

FOREIGN PATENT DOCUMENTS

EP 0 740 486 4/1996

(Continued)

OTHER PUBLICATIONS

The UMTS Mobility Server: a Solution to Support Third Generation Mobility in ATM; XP000646127; De Vriendt, et al.; Publication Date Feb. 21, 2003; pp. 251-262.

*Primary Examiner*—Philip J. Sobutka
(74) *Attorney, Agent, or Firm*—Perman & Green, LLP

(57) ABSTRACT

A method and system are disclosed for controlling radio communications between a terminal (MS, TE) and a communications system (CN, GRAN). A communications connection between the system and the terminal is established by an active radio network controller (RNC) and an active base station (BS). In one embodiment, data communications within the communications connection is directed to the active radio controller by a second radio network controller.

62 Claims, 17 Drawing Sheets

FOREIGN PATENT DOCUMENTS

| | | |
|---|---|---|
| EP | 0740486 A2 | 10/1996 |
| EP | 0769884 A2 | 4/1997 |
| WO | WO 95/04423 | 2/1995 |
| WO | WO 96/26620 | 8/1996 |

* cited by examiner

CONTROL OF RADIO COMMUNICATION NETWORK HAVING PLURAL RADIO NETWORK CONTROLLERS INCLUDING AN ANCHOR CONTROLLER

CROSS-REFERENCE TO RELATED APPLICATION

This application is a continuation of and claims priority from U.S. patent application Ser. No. 09/075,158 filed on May 8, 1998, now U.S. Pat. No. 6,574,473 the disclosure of which is incorporated hereby by reference in its entirety.

The invention relates to a method and system for controlling a radio communications network and a radio network controller. Particularly the invention relates to the handover procedure in a cellular system. The invention can be advantageously applied in broadband radio networks that offer fixed network services to their users.

Below it will be described the prior art by first illustrating the operation of a popular second-generation cellular system and in particular the handover, or change of active base stations serving a mobile station moving in the cellular network's coverage area. Then it will be disclosed the characteristics of new, third-generation cellular systems and problems related to prior-art handover solutions.

Prior Art; Second-generation Cellular Systems

A terminal of a cellular radio system attempts to choose a base station so as to operate on said base station's coverage area, or cell. Conventionally, the choice has been based on the measurement of the strength of the received radio signal in the terminal and base station. For example, in GSM (Global System for Mobile telecommunications) each base station transmits a signal on a so-called broadcast control channel (BCCH) and the terminals measure the strengths of the received BCCH signals and based on that, determine which cell is the most advantageous one as regards the quality of the radio link. Base stations also transmit to the terminals information about the BCCH frequencies used in the neighbouring cells so that the terminals know what frequencies they have to listen to in order to find the BCCH transmissions of the neighbouring cells.

Figure 1:
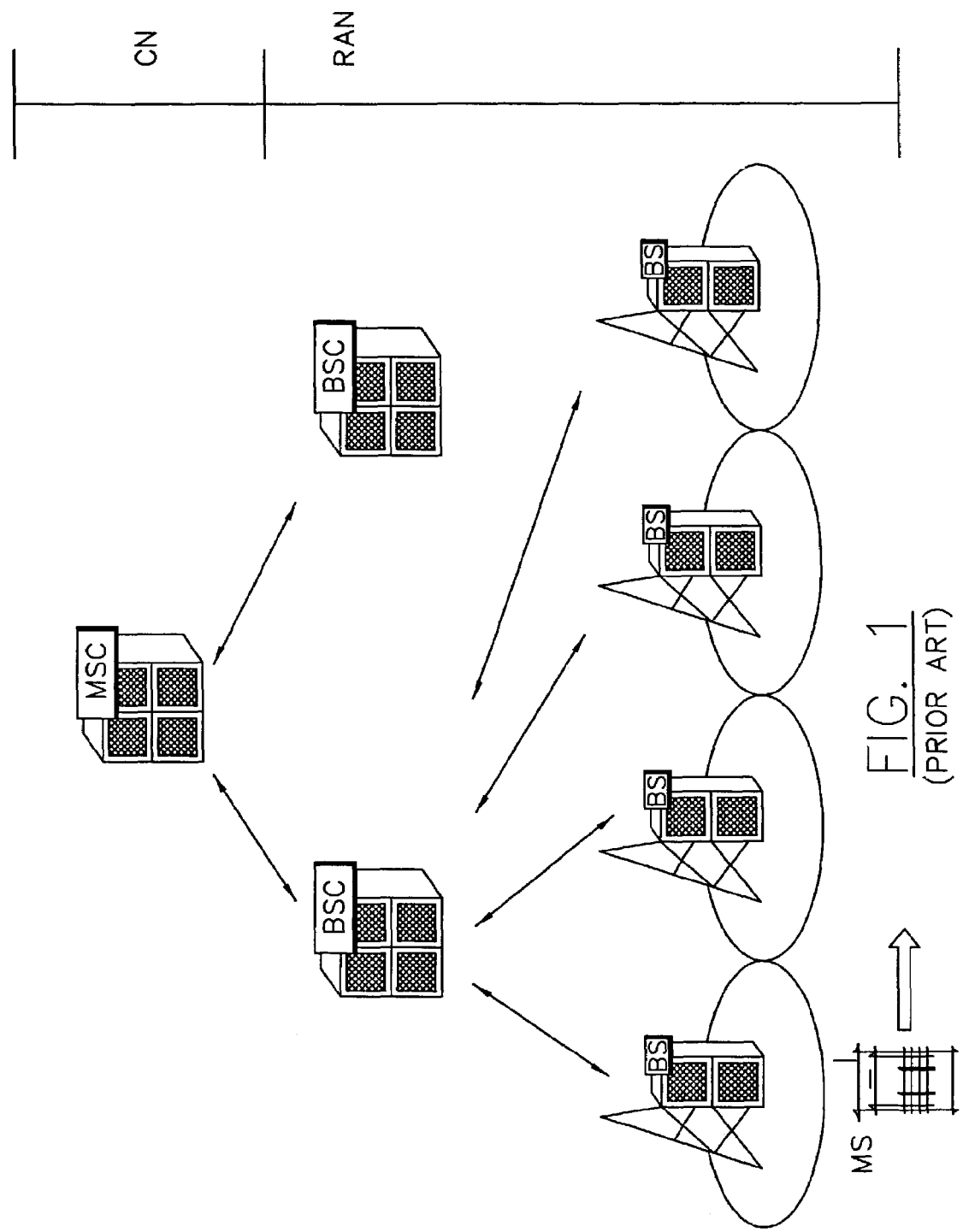
Figure 2:
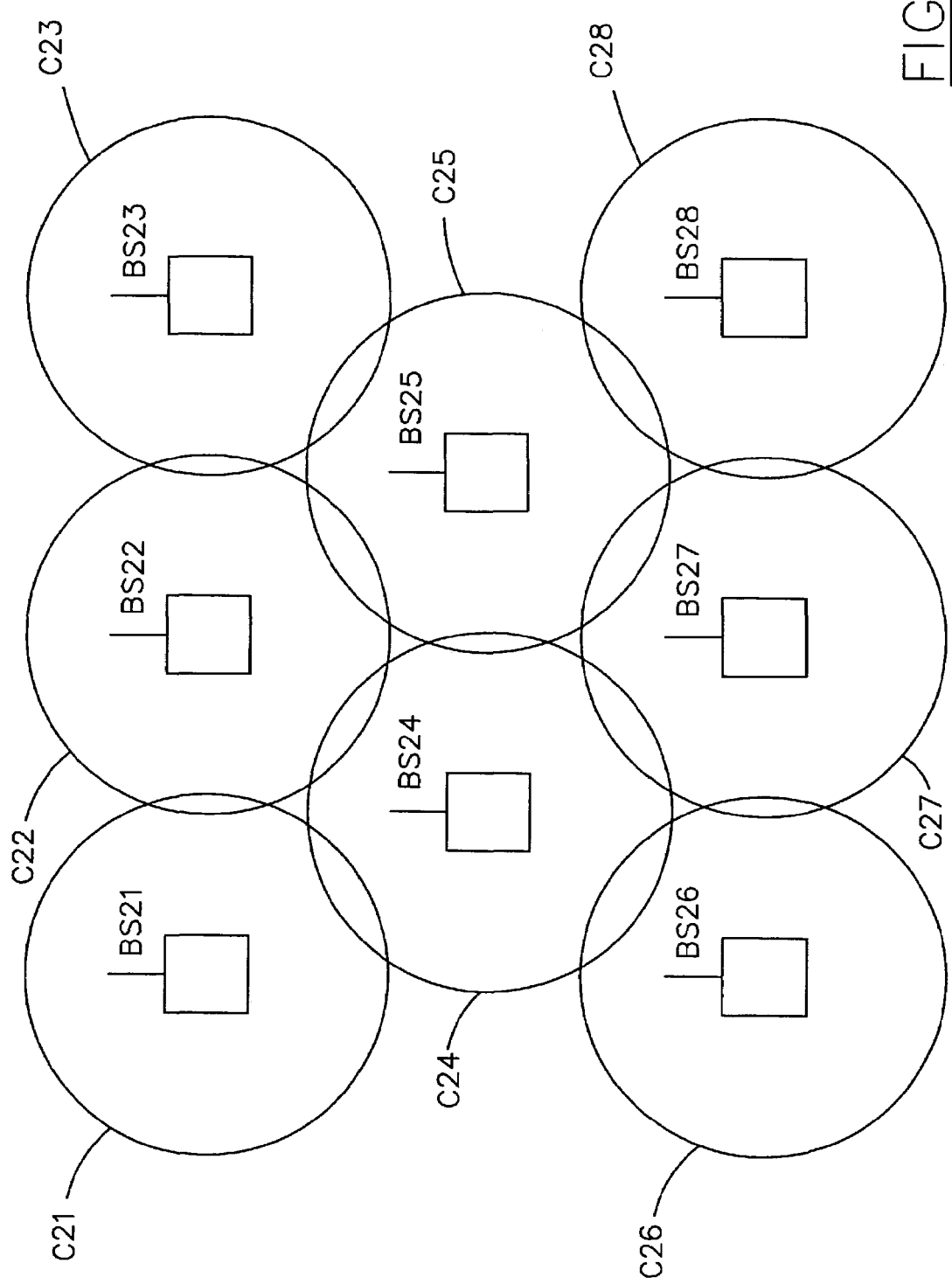

FIG. 1 shows a second-generation cellular system that comprises a mobile switching centre (MSC) belonging to the core network (CN) of the cellular system as well as base station controllers (BSC) and base stations (BS) belonging to the a radio access network (RAN), to which mobile stations (MS) are linked via radio interface. FIG. 2 shows the coverage areas C21-C29 of base stations BS21-BS29 of a second-generation cellular system.

In second-generation cellular systems, such as GSM, communication between base stations BS and the core network CN occurs via base station controllers BSC. Usually, one base station controller controls a large number of base stations so that when a terminal moves from the area of a cell to the area of another cell, the base stations of both the old and the new cell are connected to the same base station controller. Thus the handover can be executed in the base station controller. So, in the conventional GSM system, for example, there occur fairly few handovers between a base station of a first base station controller and a base station of a second base station controller. In such a case, the switching centre has to release the connection with the first base station controller and establish a new connection with the new base station controller. Such an event involves a lot of signaling between the base station controllers and the switching centre and as the distances between the base station controllers and the switching centre may be long there may occur disturbances in the connection during the handover.

Third-generation Cellular Systems

The prior-art handover arrangement is suitable for the so-called second-generation digital cellular radio systems such as GSM and its extension DCS1800 (Digital Communications System at 1800 MHz), IS-54 (Interim Standard 54), and PDC (Personal Digital Cellular). However, it has been suggested that in future third-generation digital cellular systems the service levels offered to the terminals by the cells may differ considerably from a cell to another. Proposals for third-generation systems include UMTS (Universal Mobile Telecommunications System) and FPLMTS/IMT-2000 (Future Public Land Mobile Telecommunications System/International Mobile Telecommunications at 2000 MHz). In these plans cells are categorised according to their size and characteristics into pico-, nano-, micro- and macrocells, and an example of the service level is the bit rate. The bit rate is the highest in picocells and the lowest in macrocells. The cells may overlap partially or completely and there may be different terminals so that not all terminals necessarily are able to utilise all the service levels offered by the cells.

Figure 3:
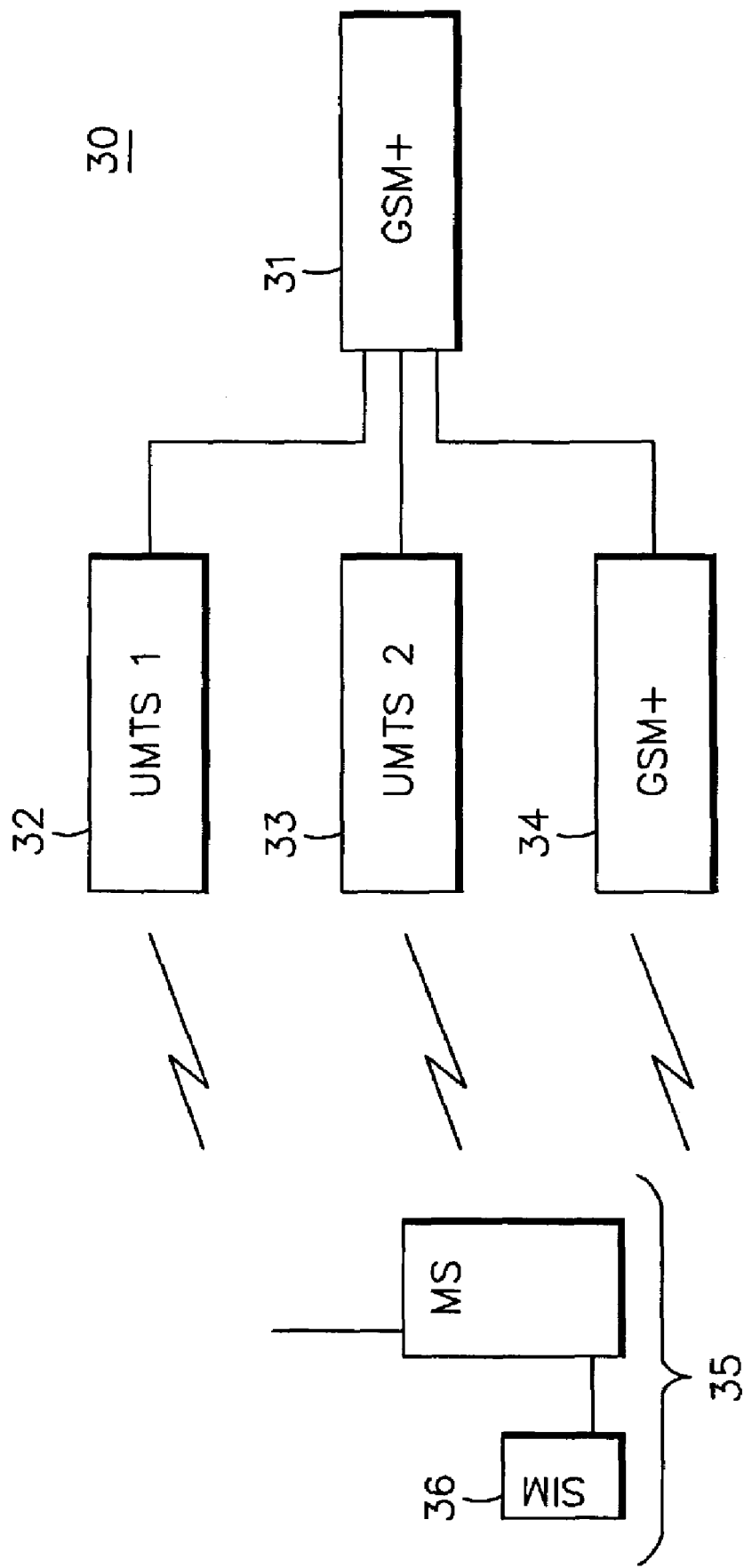

FIG. 3 shows a version of a future cellular radio system which is not entirely new compared with the known GSM system but which includes both known elements and completely new elements. In current cellular radio systems the bottleneck that prevents more advanced services from being offered to the terminals comprises the radio access network RAN which includes the base stations and base station controllers. The core network of a cellular radio system comprises mobile services switching centres (MSC), other network elements (in GSM, e.g. SGSN and GGSN, i.e. Serving GPRS Support Node and Gateway GPRS Support node, where GPRS stands for General Packet Radio Service) and the related transmission systems. According e.g. to the GSM+ specifications developed from GSM the core network can also provide new services.

In FIG. 3, the core network of a cellular radio system 30 comprises a GSM+ core network 31 which has three parallel radio access networks linked to it. Of those, networks 32 and 33 are UMTS radio access networks and network 34 is a GSM+ radio access network. The upper UMTS radio access network 32 is e.g. a commercial radio access network, owned by a telecommunications operator offering mobile services, which equally serves all subscribers of said telecommunications operator. The lower UMTS radio access network 33 is e.g. private and owned e.g. by a company in whose premises said radio access network operates. Typically the cells of the private radio access network 33 are nano- and/or picocells in which only terminals of the employees of said company can operate. All three radio access networks may have cells of different sizes offering different types of services. Additionally, cells of all three radio access networks 32, 33 and 34 may overlap either entirely or in part. The bit rate used at a given moment of time depends, among other things, on the radio path conditions, characteristics of the services used, regional overall capacity of the cellular system and the capacity needs of other users. The new types of radio access networks mentioned above are called generic radio access networks (GRAN). Such a network can co-operate with different types of fixed core networks CN and especially with the GPRS network of the GSM system. The generic radio access network (GRAN) can be defined as a set of base stations (BS) and radio network controllers (RNC) that are capable of communicating with each other using signaling messages. Below, the generic radio access network will be called in short a radio network GRAN.

The terminal 35 shown in FIG. 3 is preferably a so-called dual-mode terminal that can serve either as a second-generation GSM terminal or as a third-generation UMTS terminal according to what kind of services are available at each particular location and what the user's communication needs are. It may also be a multimode terminal that can function as terminal of several different communications systems according to need and the services available. Radio access networks and services available to the user are specified in a subscriber identity module 36 (SIM) connected to the terminal.

Figure 4:
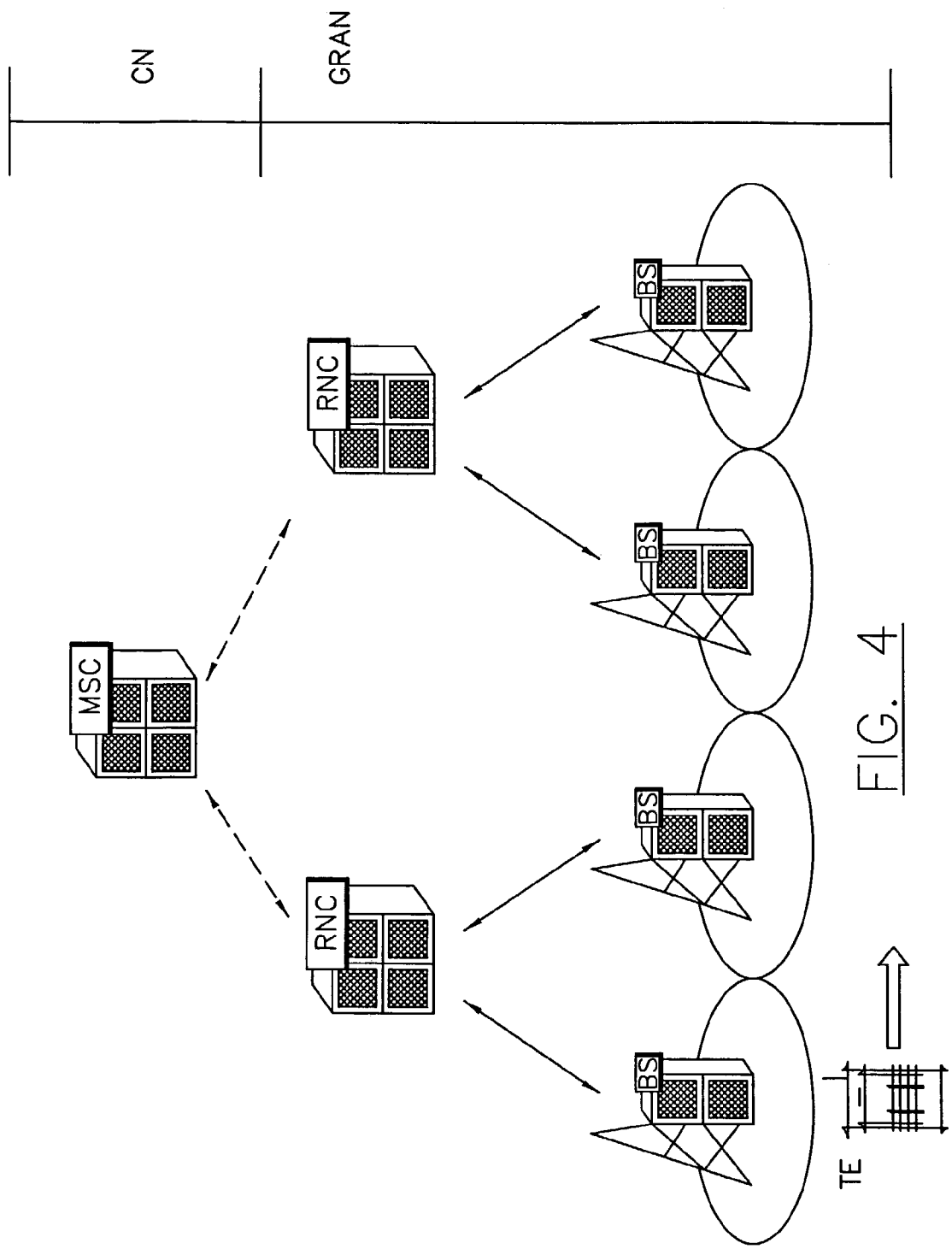

FIG. 4 shows in more detail a core network CN of a third-generation cellular system, comprising a switching centre MSC, and a radio network GRAN connected to the core network. The radio network GRAN comprises radio network controllers RNC and base stations BS connected to them. A given radio network controller RNC and the base stations connected to it are able to offer broadband services while a second radio network controller and base stations connected to it may be able to offer only conventional narrowband services but possibly covering a larger area.

Figure 5:
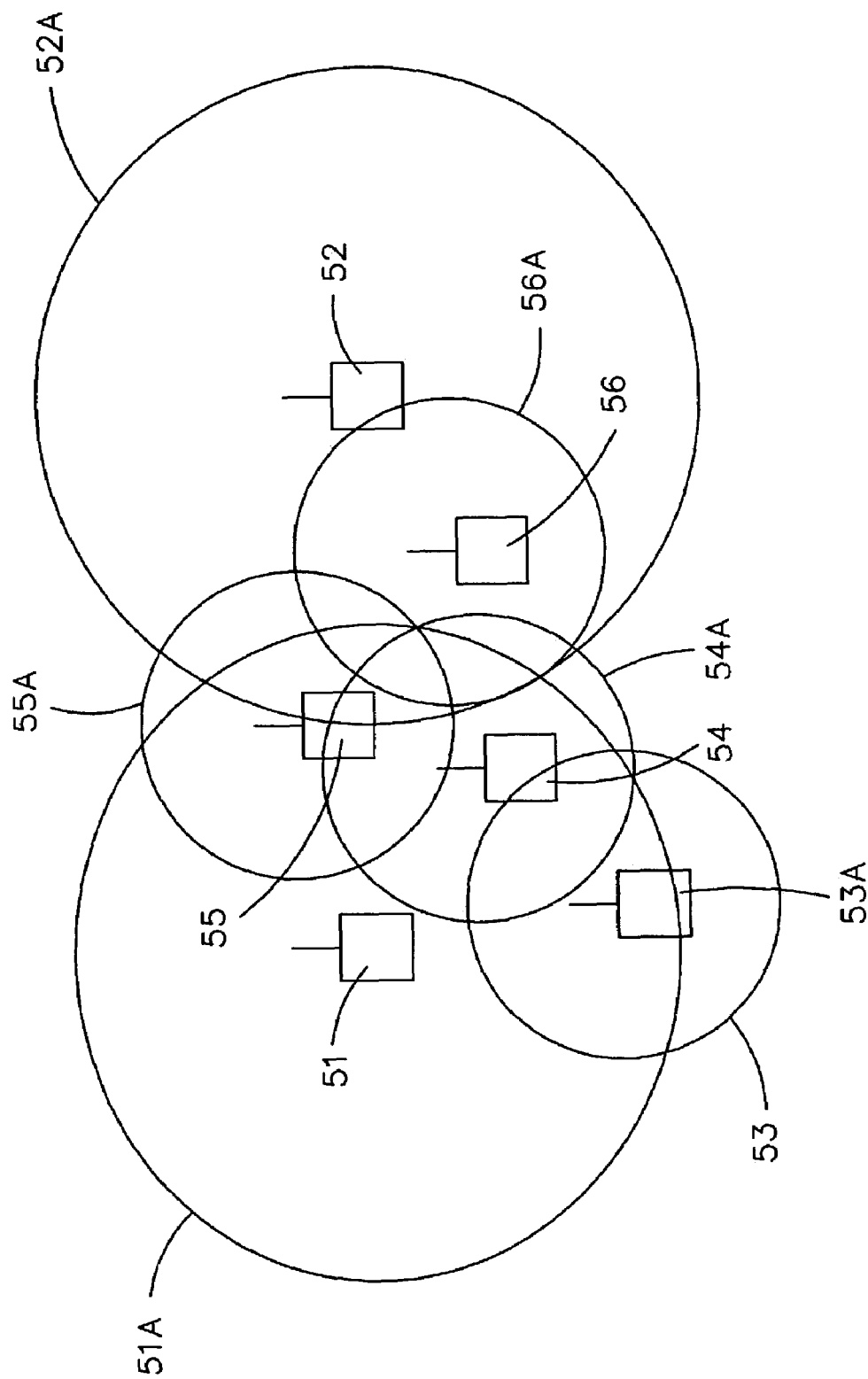

FIG. 5 shows coverage areas 51a-56a of base stations 51-56 in a third-generation cellular system. As can be seen from FIG. 5, a mobile station travelling only a short distance can choose from many base stations for the radio link.

New cellular systems can employ a so-called macrodiversity combining technique related to CDMA systems. This means that on the downlink path a terminal receives user data from at least two base stations and correspondingly, the user data transmitted by the terminal is received by at least two base stations. Then, instead of one, there are two or more active base stations, or a so-called active set. Using macrodiversity combining it is possible to achieve a better quality of data communications as momentary fade-outs and disturbances occurring on a given transmission path can be compensated for by means of data transmitted via a second transmission path.

For selecting an active set an active radio network controller determines, on the basis of the geographic location, for example, a candidate set of base stations, which is a set of the base stations that are used for measuring general signal strength information using e.g. a pilot signal. Below, this candidate set of base stations will be called a candidate set (CS) in short. In some systems, such as IS-41, separate candidate base stations are used.

Problems Related to Prior Art

Let us consider the application of a prior-art arrangement to a proposed third-generation digital cellular system. In third-generation systems, base station handovers and radio network controller handovers are more frequent than in second-generation systems. One of the reasons behind this is that the cell sizes may be remarkably small and that there may occur need to change the service type e.g. from narrowband to broadband during a call.

In accordance with the prior art a handover between radio network controllers would be carried out in such a manner that the user data connection between the switching centre and the so-called old active radio network controller/base station is released and a new connection is established between the switching centre and the so-called new active radio network controller/base station. Then the switching centre would have to release/set up many connections, which involves a lot of signaling between the switching centre and the radio network controller. Further-more, there are very many small-sized cells in the area of one switching centre, and in broadband applications the amount of user data transmitted is great. This puts very tight requirements for capacity and speed on the switching centre hardware, which in large systems cannot be met at reasonable costs using current technology.

Secondly, known systems have a problem of how to transmit signaling and data of the core network CN and signaling of the radio network to a terminal moving in the radio network's area. CN signaling and data are specifically meant for the terminal and routed via radio network controllers. Radio network signaling may be intended either for the terminal or for the radio network itself so that it can arrange optimal use of radio resources in the network area. The problem is caused by the moving terminal and its effect on the flow of data in the radio network's area.

When using macrodiversity combining the prior art further has the problem that after a handover between radio network controllers the new radio network controller does not have knowledge of the base stations suitable for macrodiversity combining so that macrodiversity combining cannot be used before the new radio network controller has established a candidate set of its own. Therefore, transmission power has to be increased and only one transmission path can be used temporarily between the system and the terminal. This degrades the quality of communications and causes stability problems which must be corrected by constant adjustments.

General Description of the Invention

Handovers between active base stations serving a terminal can be categorised as follows:
1. handover between base stations (base station sectors) (intra-RNC HO)
2. handover between radio network controllers inside a generic radio network (inter-RNC HO) and
3. handover between generic radio networks (inter-GRAN HO).

The present invention primarily relates to handovers between radio network controllers inside a generic radio network (item 2 above).

An object of the present invention is to provide a radio network control arrangement eliminating above-mentioned disadvantages related to the prior-art arrangements.

One idea of the invention is that a connection is assigned a radio network controller through which the user data are directed also when some other radio network controller is the active radio network controller. This radio network controller assigned to a connection is here called an anchor controller. If during a connection a base station connected to another radio network controller is chosen the active base station, the user data are directed such that they travel to the active radio network controller via the anchor controller.

The use of an anchor controller in accordance with the invention brings considerable advantages compared to the prior art. First, the radio network topology becomes simple and clear, and the network can be easily extended and re-configured. Second, internal traffic events in the radio network are handled within the radio network controlled by the anchor function so that a handover between radio network controllers is fast so that it is easier to meet the requirements for a seamless and lossless handover and the load of the mobile switching centre MSC remains moderate.

A particularly significant advantage is that the operation of the radio network can be made optimal as regards the use of radio resources. Furthermore, when using an anchor controller, data encryption can be performed in the anchor controller so that encryption keys need not be transmitted during a connection from a radio network controller to another.

Transmission routing from the anchor controller to the active radio network controller can be performed by means of chaining so that all active radio network controllers used during a call remain transmission links for the duration of the call. Another alternative is to use optimum routing where radio network controllers between the anchor controller and the active radio network controller are bypassed.

Optimum radio network controller routing used in connection with the invention also brings further advantages. First, the internal signaling load of the radio network remains moderate and signaling can be easily made fast enough. In addition, the radio network controller's processing requirements remain reasonable, which makes the solution practical.

A second idea of the invention is that in preparation for a handover a list is compiled in a neighbouring radio network controller of those base stations that would constitute the candidate set should said neighbouring radio network controller be made the active radio network controller. Then the active set AS becomes in conjunction with the handover the new active set AS'. Said list is here called an external base station candidate set. When compiling external candidate sets it is advantageous to use a boundary base station list (BBSL) that can help determine whether a handover is likely. In addition, so-called intense monitoring can be used for an external base station set.

The use of an external base station candidate set brings e.g. the following advantages. First, the transmission power change related to the handover is not great at the interface but the use of power is "smooth". This results in small total power consumption in the interface area and low interference-induced noise level. In addition, the solution achieves a continuous state as regards the network so that handovers will not cause deviations from the normal operation and thus a stability problem.

The method according to the invention for controlling radio traffic between a terminal and a communications system, which comprises radio network controllers and base stations to establish a communications connection between the system and the terminal connected to it and wherein a first radio network controller and second radio network controller serve as active radio network controllers during the connection, is characterised in that when said second radio network controller is active, the connection is routed to said second radio network controller via said first radio network controller.

The communications system according to the invention, which comprises radio network controllers and base stations to establish a communications connection between the system and the terminal connected to it and wherein a first radio network controller and second radio network controller serve as active radio network controllers during the connection, is characterised in that when said second radio network controller is active, the connection is routed to said second radio network controller via said first radio network controller.

A communications system radio network controller according to the invention is characterised in that it comprises means for routing communications to another radio network controller during a connection.

A second radio network controller according to the invention is characterised in that it comprises means for routing the traffic related to a connection between a base station and the second radio network controller.

Preferred embodiments of the invention are disclosed in the sub-claims.

"Active" base station here means a base station that has a user data connection with a terminal. "Active" radio network controller here means a radio network controller with which the active base station is in direct connection so that user data can be transmitted to the active base station.

"Old" base station and radio network controller mean a base station or radio network controller that was active before the handover, and "new" base station or radio network controller means a base station or radio network controller which is active after the handover. It is also possible that several radio network controllers are active simultaneously.

"Handover" here refers to a handover between base stations, radio network controllers or radio networks. After the handover it is possible that also the old base station/radio network controller remains active.

"User data" here means information usually transmitted on a so-called traffic channel between two cellular system users/terminals or between a cellular system user/terminal and other terminal via a core network. It may be e.g. coded voice data, facsimile data, or picture or text files. "Signaling" refers to communications related to the management of the internal functions of the communications system.

DETAILED DESCRIPTION OF THE INVENTION

Figure 6A:
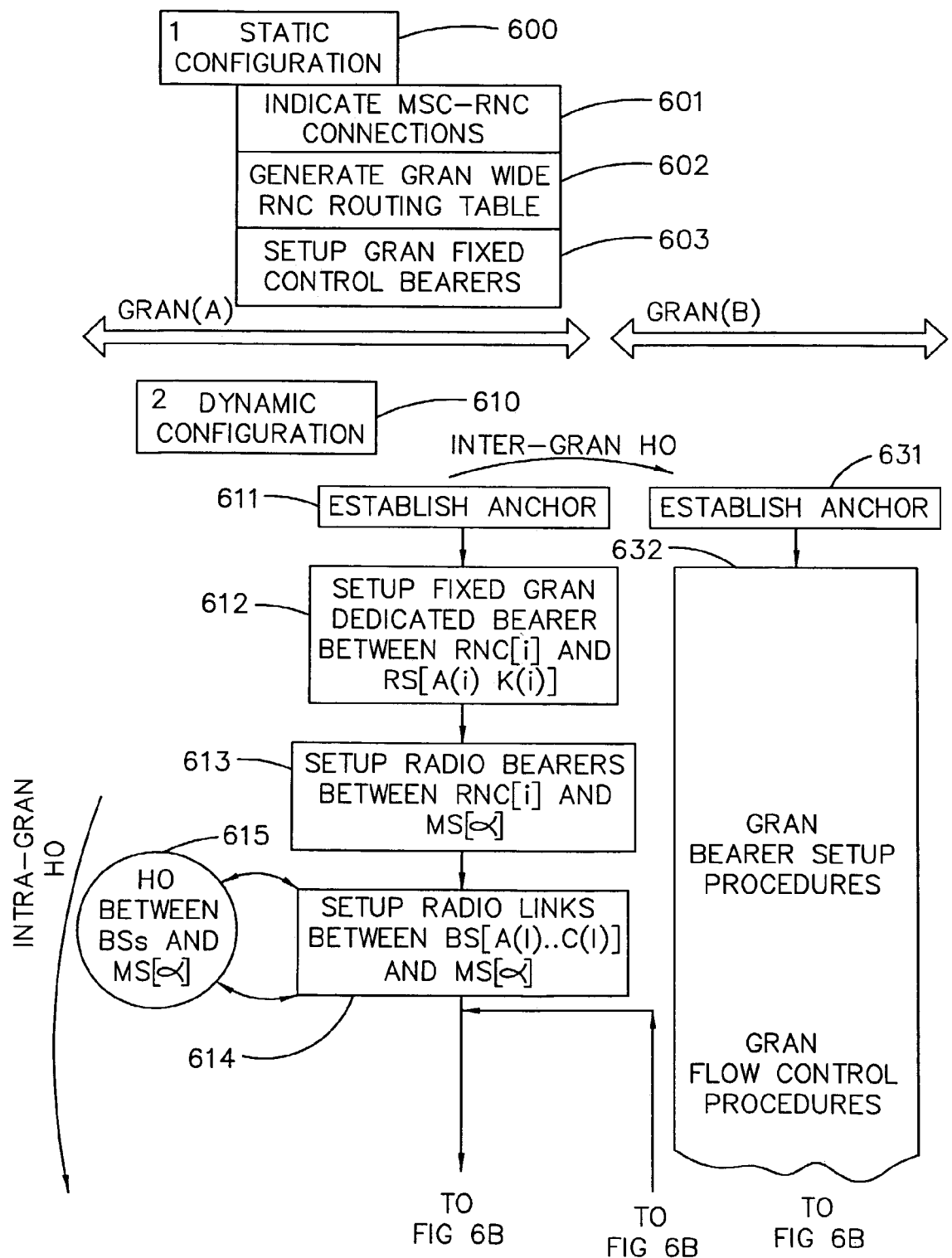
Figure 6B:
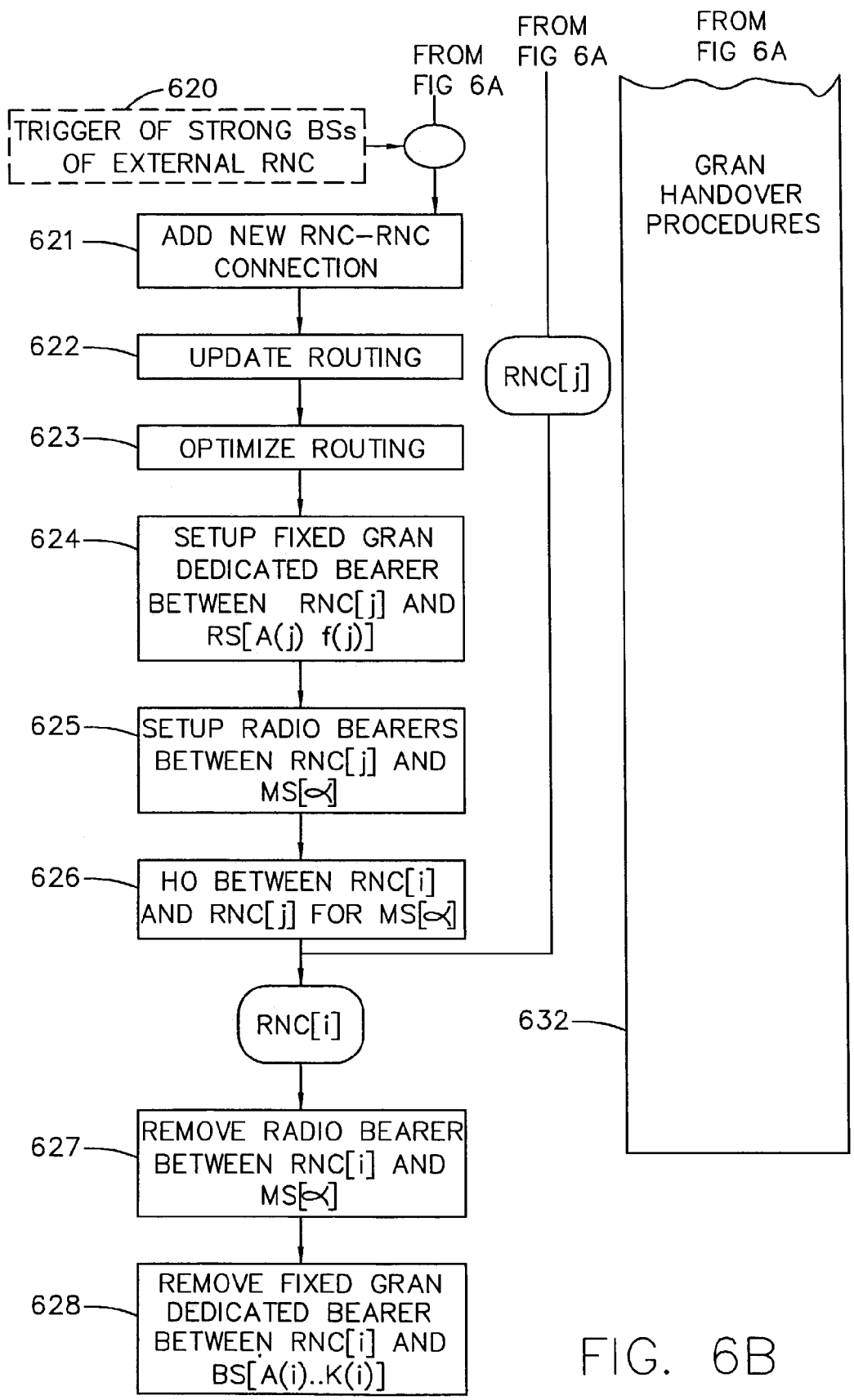
Figure 7:
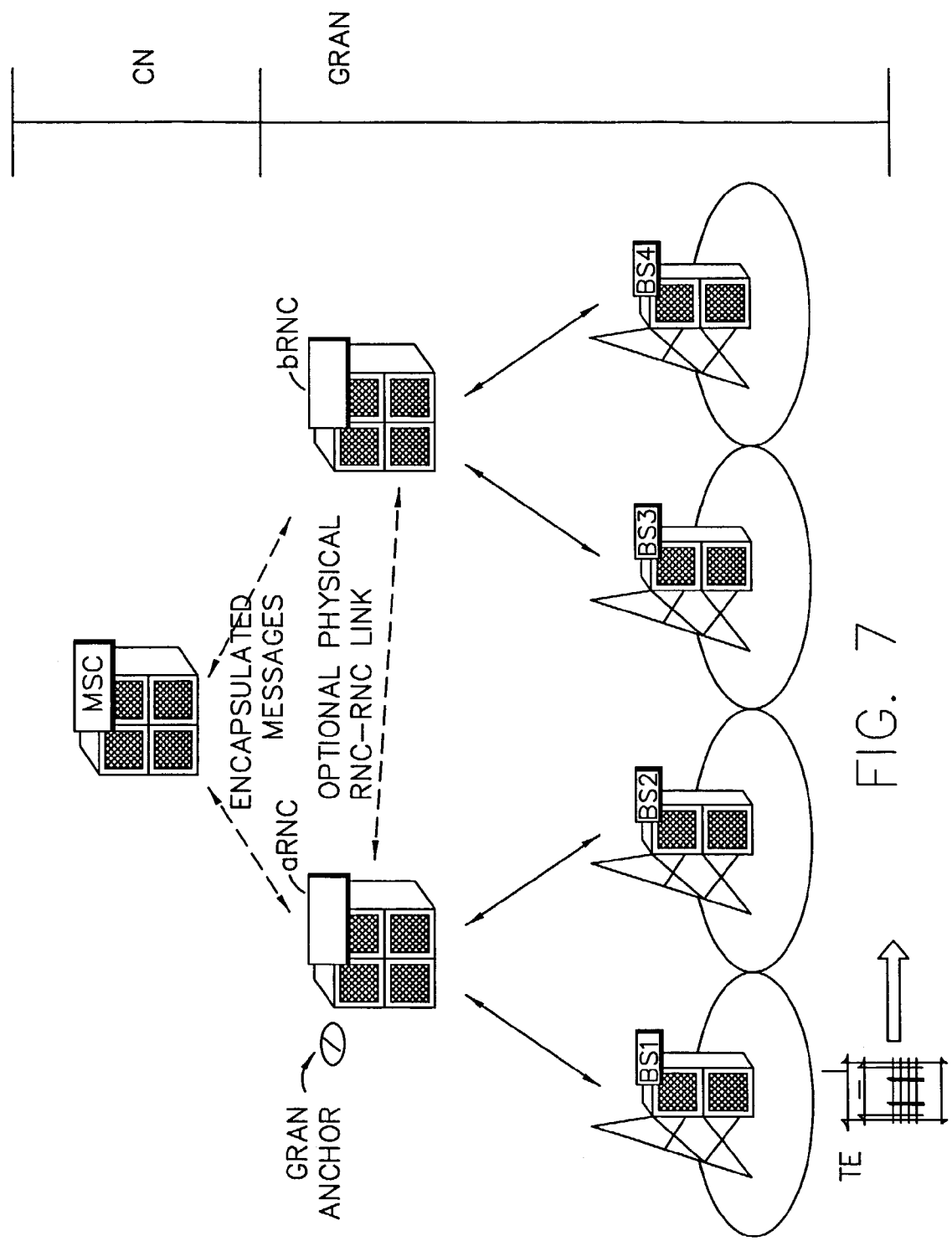
Figure 8:
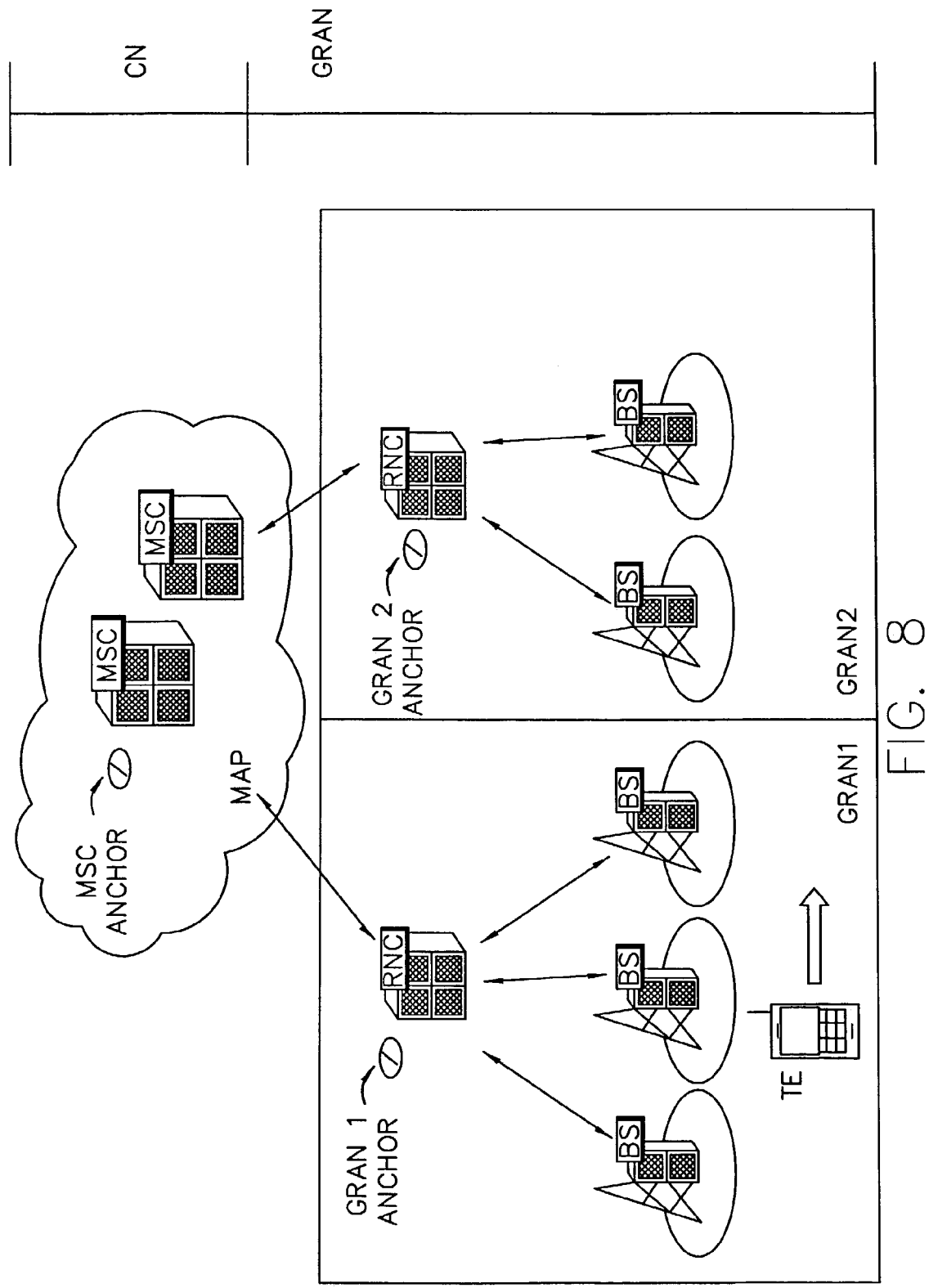
Figure 9:
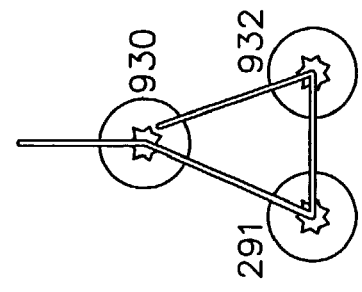
Figure 9:
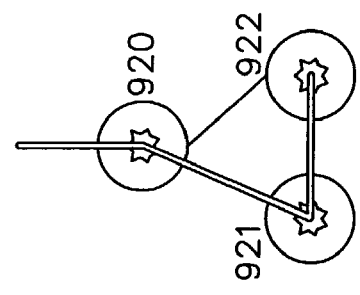
Figure 9:
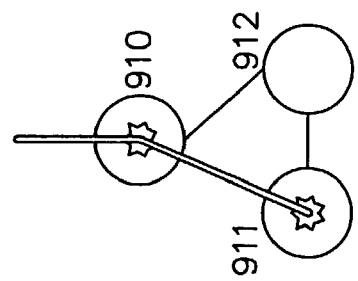
Figure 9:
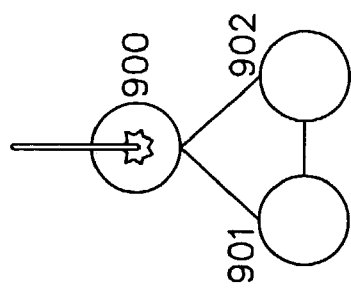
Figure 10:
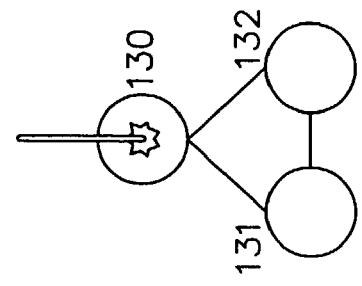
Figure 10:
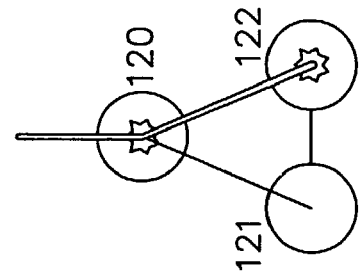
Figure 10:
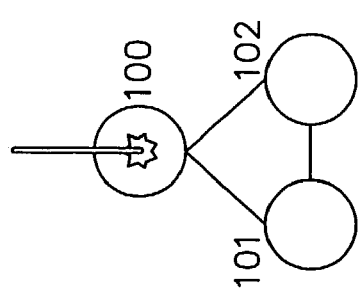
Figure 11:
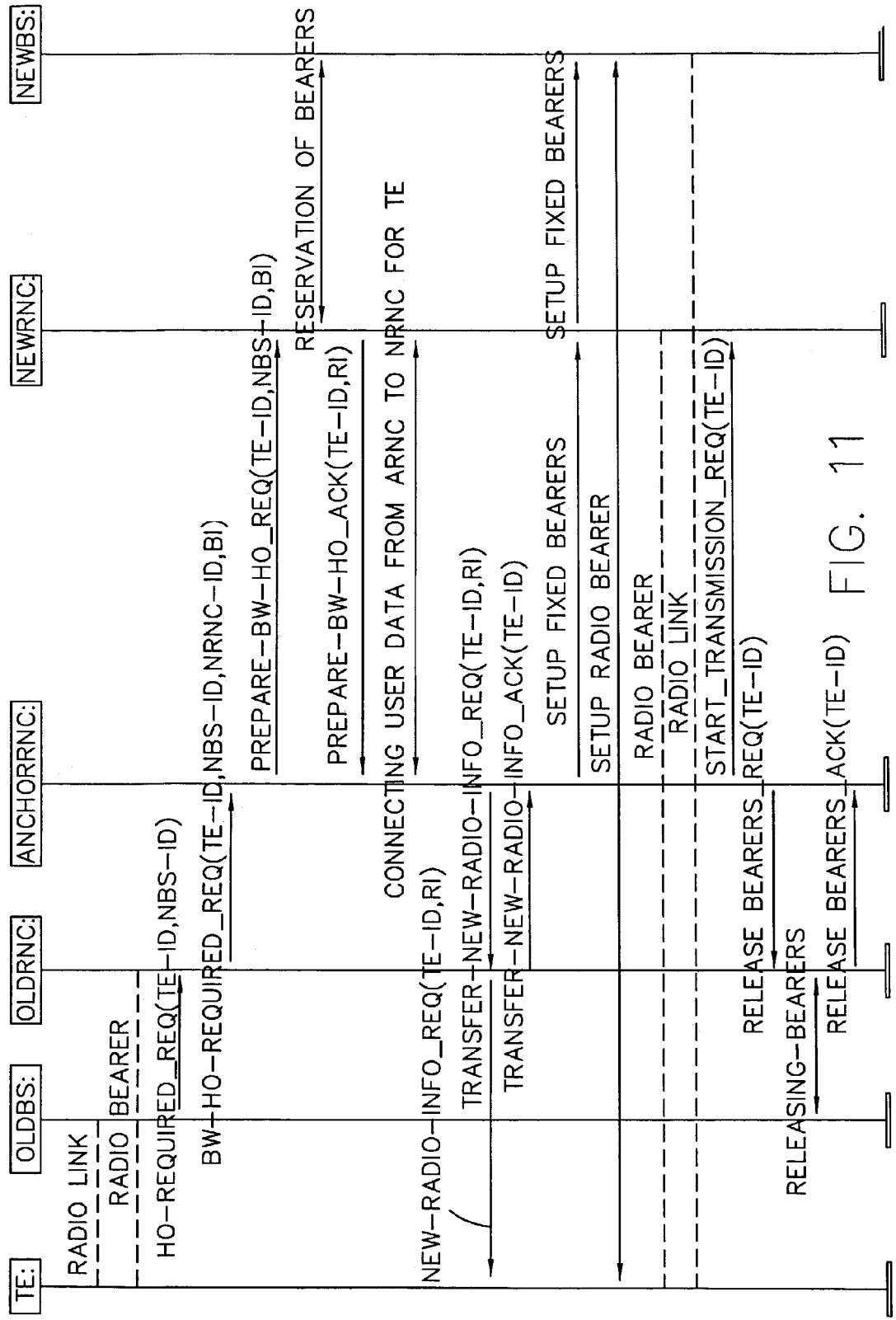
Figure 12:
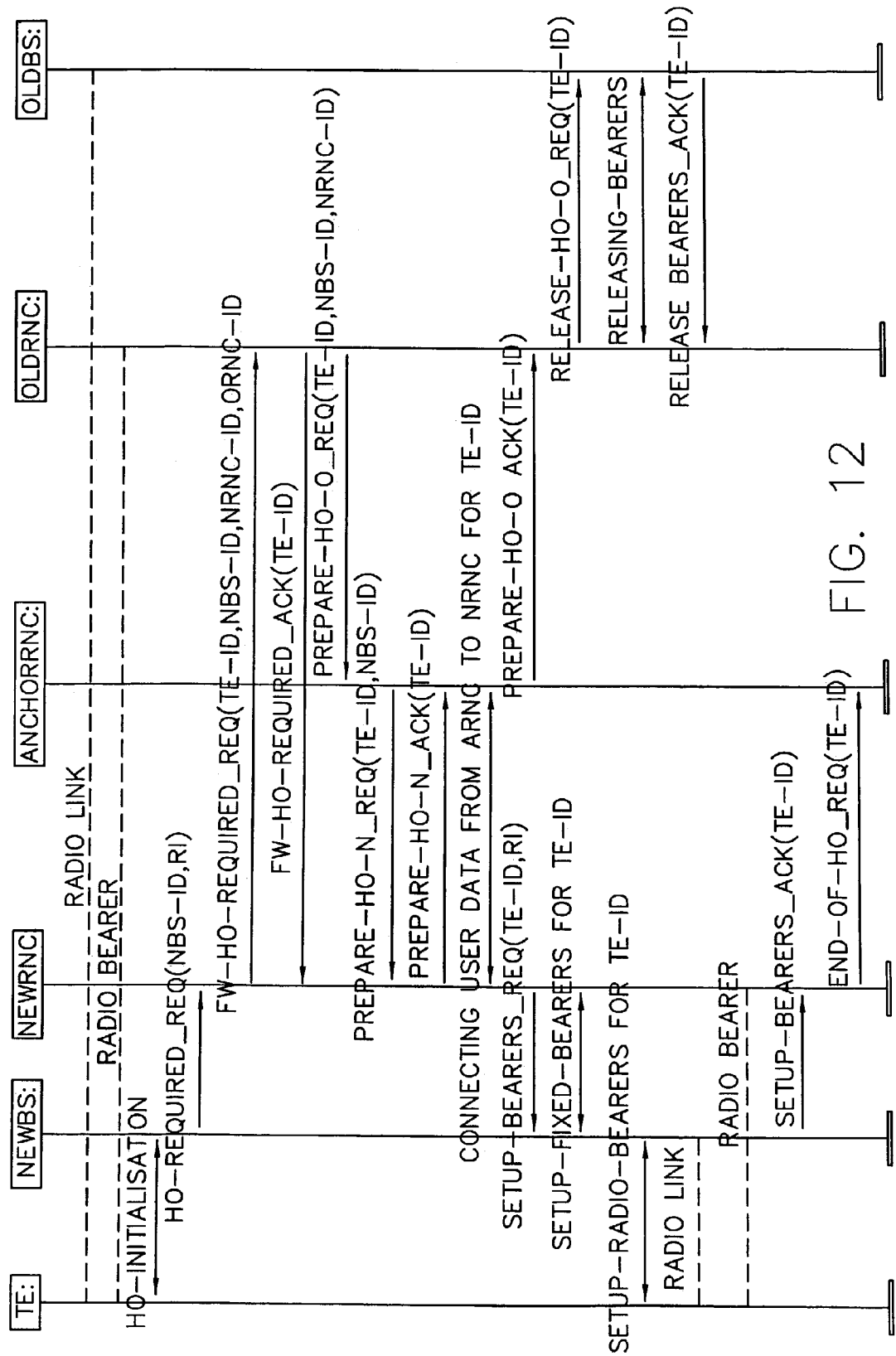
Figure 13:
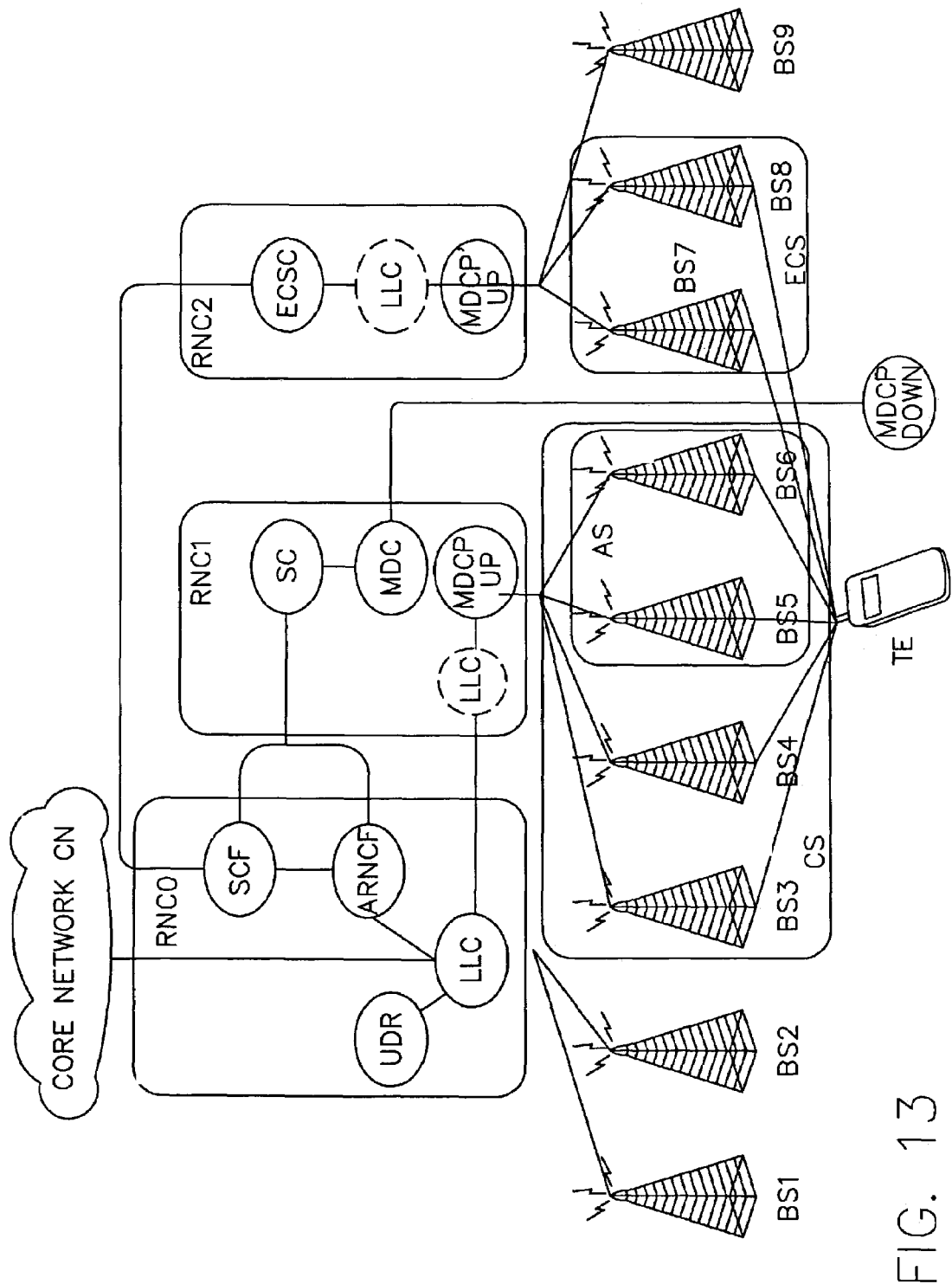
Figure 14:
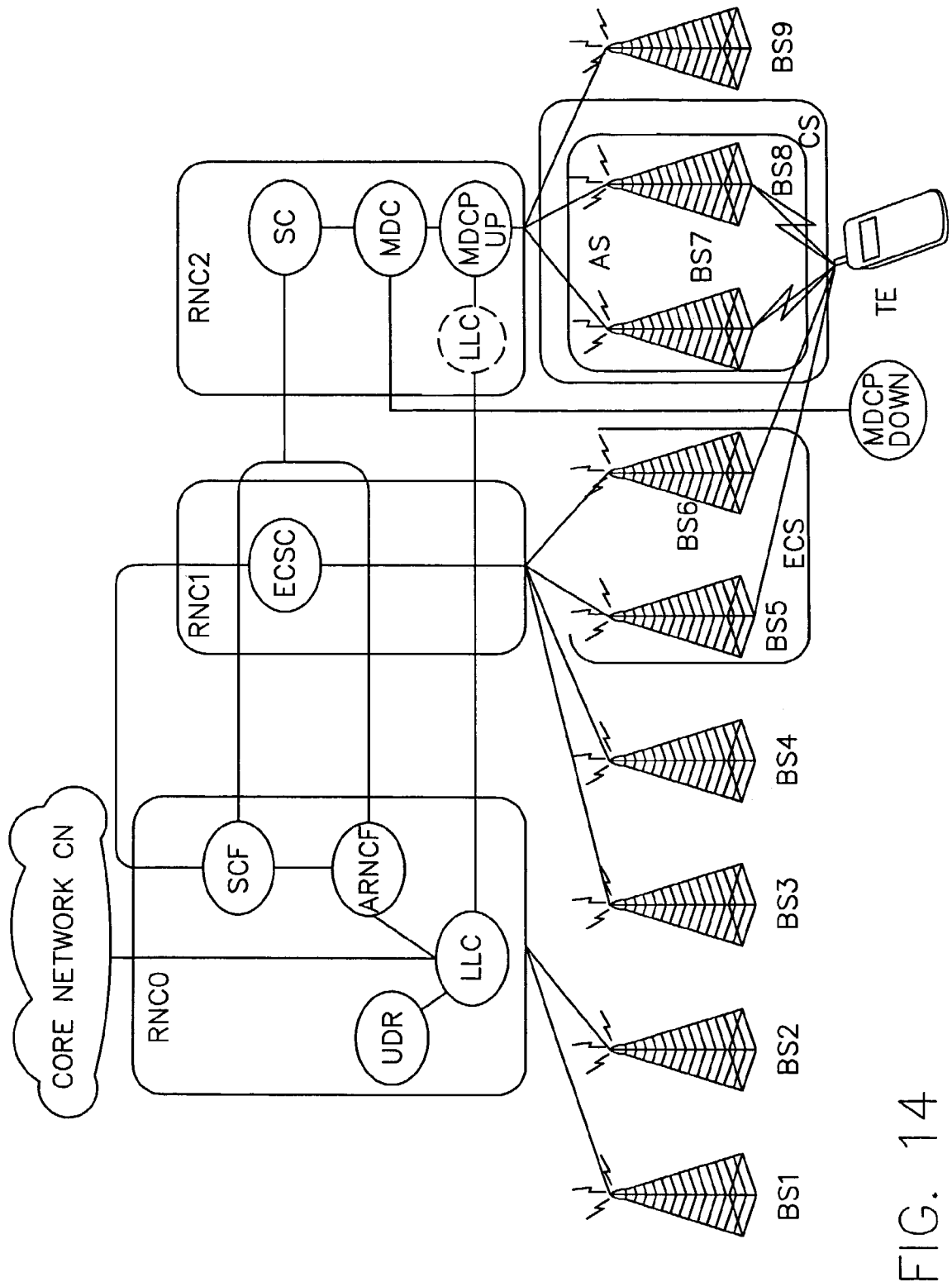
Figure 15:
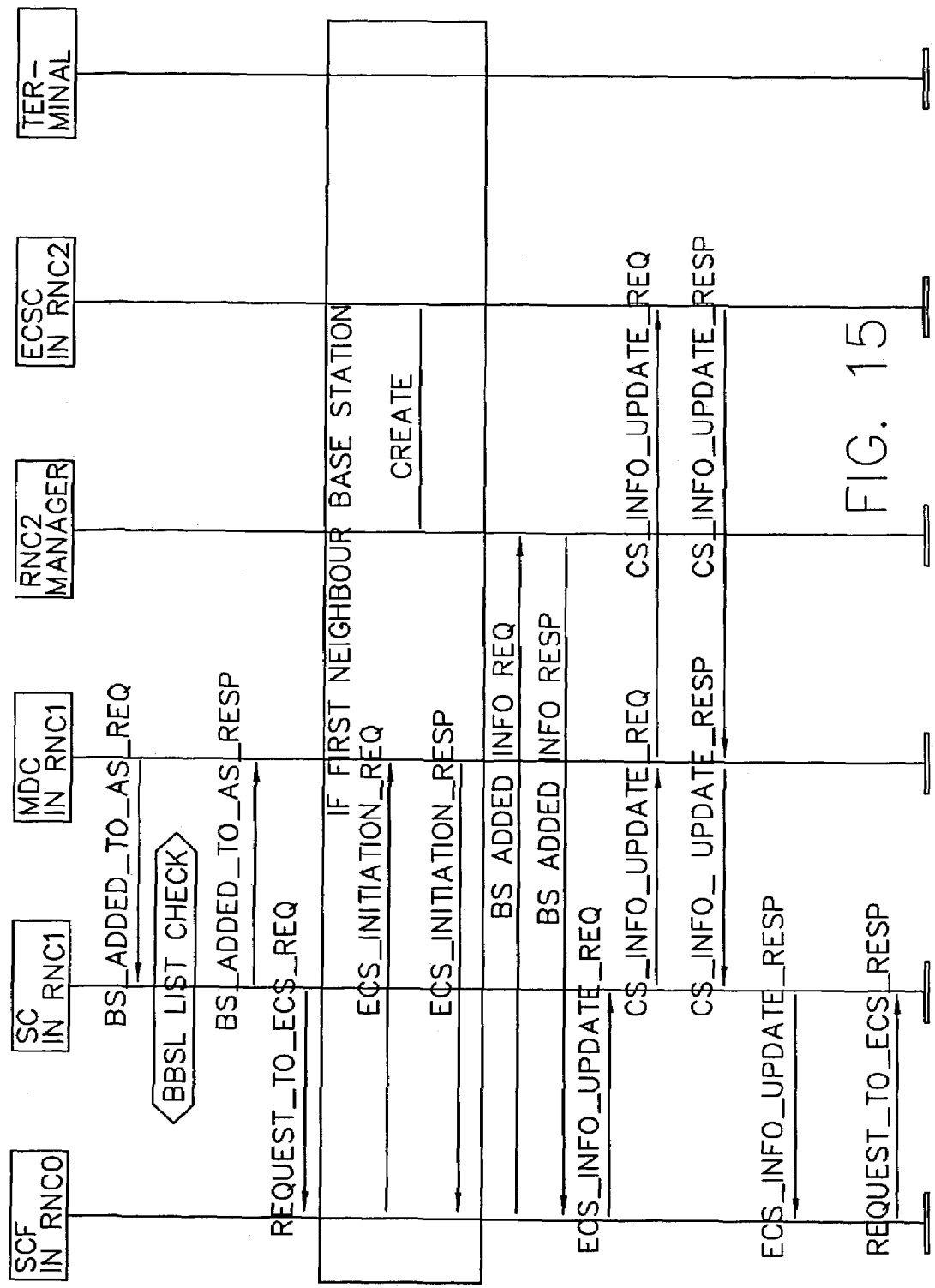
Figure 16:
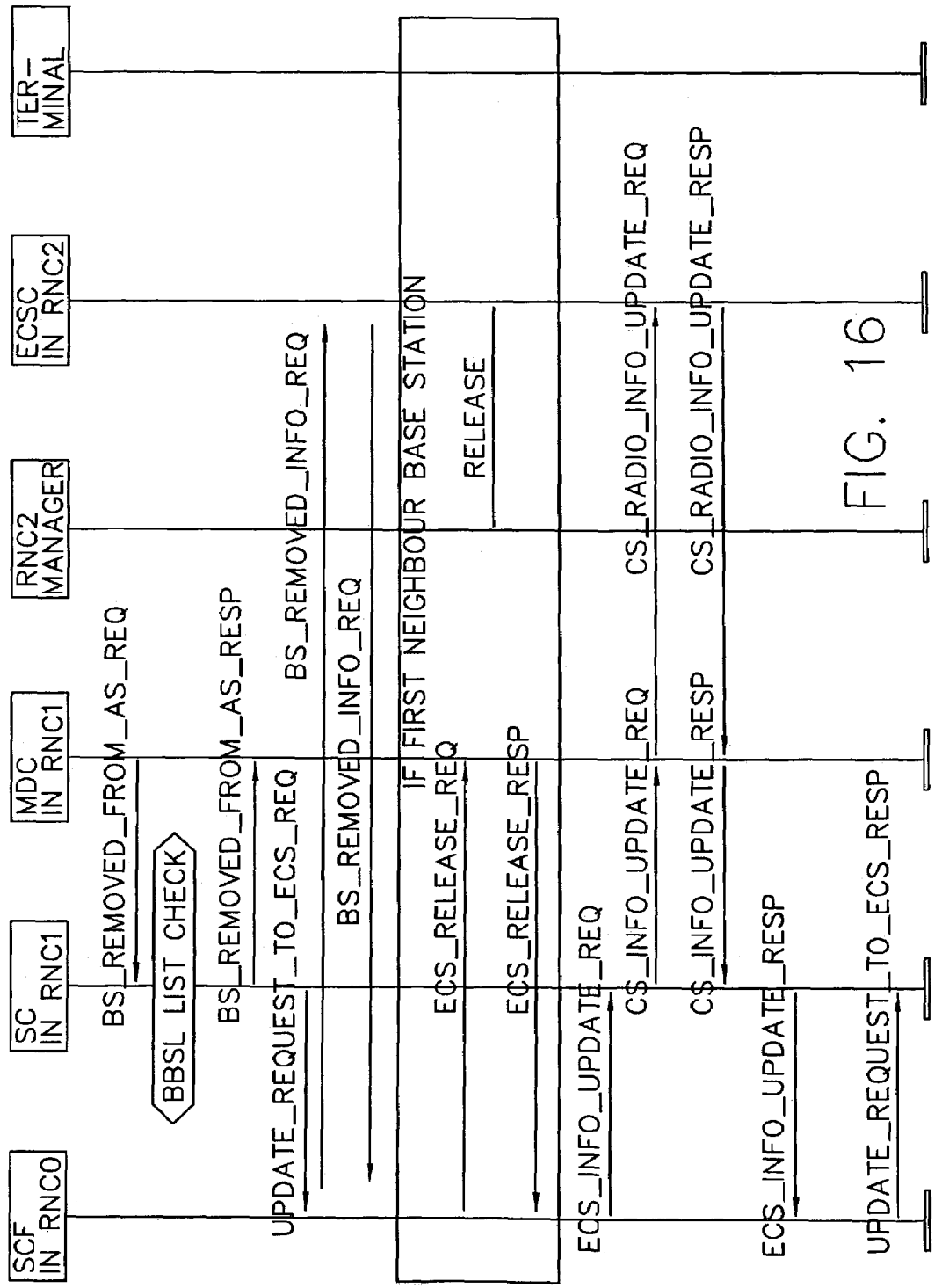
Figure 17:
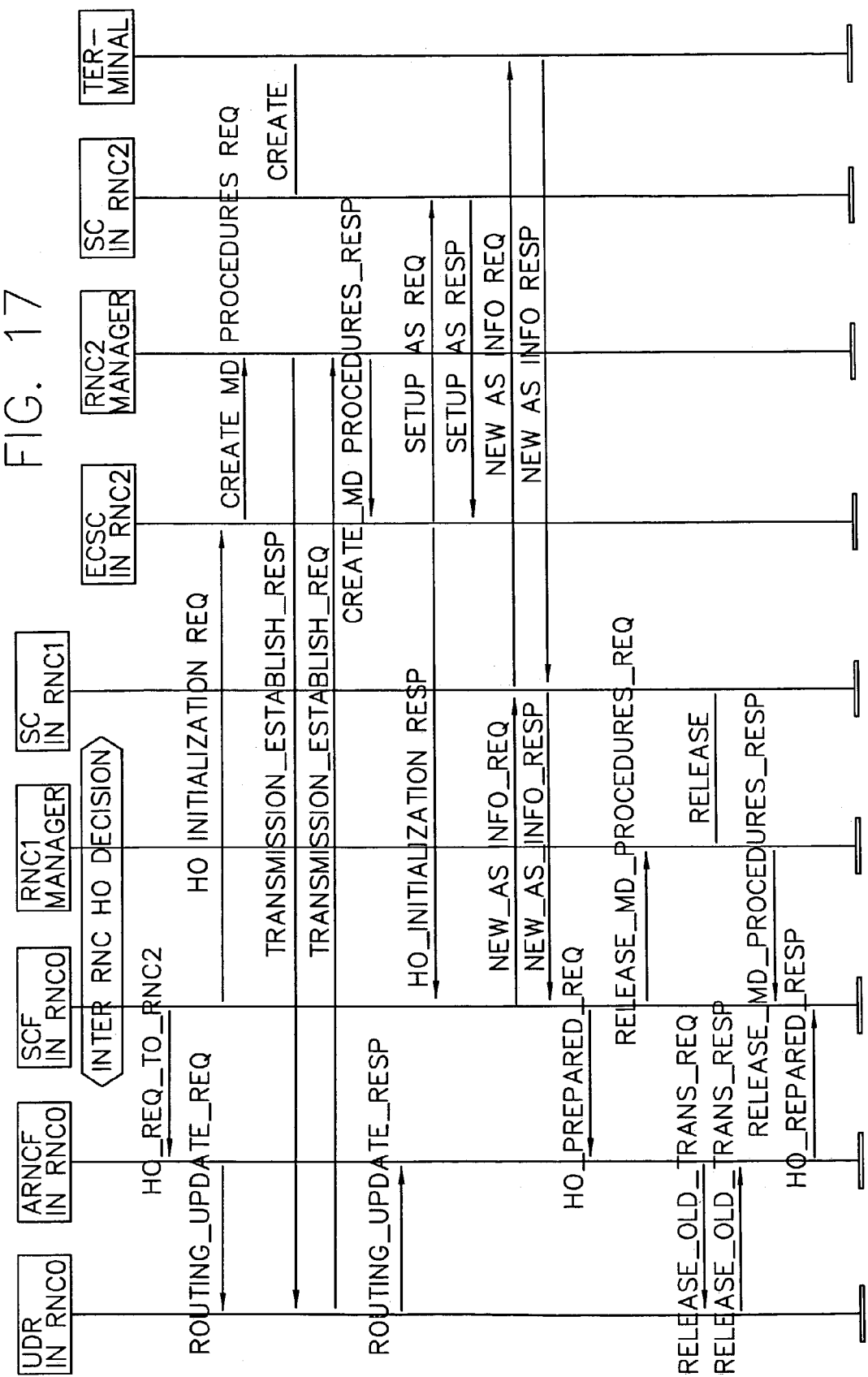

The invention is described in more detail with reference to the preferred embodiments presented by way of example and to the accompanying drawing wherein FIG. 1 shows a second-generation cellular system according to the prior art, FIG. 2 shows the coverage areas of base stations of a second-generation cellular system according to the prior art, FIG. 3 shows a third-generation cellular system, FIG. 4 shows the core network CN of a third-generation cellular system according to the prior art and the radio network GRAN in connection with it, FIG. 5 shows the coverage areas of base stations of a cellular system according to the prior art, FIG. 6 shows a flow diagram of the main steps of a method according to the invention for performing a handover between base stations, radio network controllers and radio networks, FIG. 7 shows a cellular system according to the invention and some embodiments for arranging communications between radio network controllers, FIG. 8 shows an embodiment of the invention for arranging communications between radio network controllers of different radio networks by means of the active protocol of the core network, FIG. 9 shows a technique according to the invention for performing the routing between radio network controllers by means of chaining, FIG. 10 shows a technique according to the invention for performing the routing between radio network controllers optimally, FIG. 11 shows a signaling flow chart of a backward handover in a cellular system according to the invention, FIG. 12 shows a signaling flow chart of a forward handover in a cellular system according to the invention, FIG. 13 shows functions of radio network controllers before a handover in a cellular system according to the invention, FIG. 14 shows functions of radio network controllers after a handover in a cellular system according to the invention, FIG. 15 shows a signaling diagram of a procedure according to the invention for adding a new neighbour base station to the active set during the preparation for a handover, FIG. 16 shows a signaling diagram of a procedure according to the invention for removing a neighbour base station from the active set during the preparation for a handover, and FIG. 17 shows a signaling flow chart of the execution of a handover in a cellular system according to the invention.

FIGS. 1 to 5 were discussed above in connection with the description of the prior art. Below, a method according to the invention is described briefly with reference to FIG. 6. Then, referring to FIG. 7, a cellular system according to the invention and embodiments for transmitting signaling and user data between two radio network controllers will be described. After that, referring to FIG. 8, it will be disclosed a handover between a radio network controller in a first radio network and a radio network controller in a second radio network.

Next, referring to FIGS. 9 and 10, it will be disclosed a chained and an optimised embodiment for setting up routing between radio network controllers. Then, referring to FIGS. 11 and 12, two embodiments will be described for realising optimised routing. After that, two embodiments will be disclosed for realising macrodiversity combining in a radio network according to the invention.

Next, functions of radio network controllers will be described in conjunction with a handover according to the invention with reference to FIGS. 13 and 14. Finally, with reference to FIGS. 13 to 17, it will be described the steps related to a handover in a radio network employing macrodiversity combining and external candidate set.

The description will be followed by a list of abbreviations used in the Figures and in the description.

Main Steps of a Method According to the Invention

FIG. 6 shows a flow diagram of a method according to the invention for a handover involving the active base station, active radio network controller and active radio network. First, a static configuration 600 of the system is performed comprising the steps below. In step 601, the connections between a switching centre MSC and the radio network controllers are detected, and in step 602 a GRAN-wide routing table for the radio network controllers is created. Then, the fixed connections in the radio network GRAN are established in step 603.

Then it is performed a dynamic configuration 610 of the radio network, comprising connection setup steps and connection steps as follows. First, an anchor controller is specified, step 611, after which a fixed radio network specific connection between a radio network controller RNC[i] and base stations BS[a(i) . . . k(i)] is established, step 612. Then, radio connections are set up between radio network controllers RNC[i] and mobile station MS [α], and radio links are set up between base stations BS[a(i) . . . c(i)] and mobile station MS[α], step 614. After that, possible handovers within the radio network controller are carried out in step 615.

If the mobile station receives a strong signal from a base station of an external radio network controller, step 620, a new RNC-to-RNC connection is added, step 621, and the routing is updated and optimised, steps 622 and 623. After that, a radio network controller specific fixed connection is set up between the radio network controller RNC[j] and base stations BS[a(j) . . . f(j)], step 624. Next, radio connections are set up between the radio network controller RNC[j] and mobile station MS[α], and radio links are established between base stations BS[a(j) . . . d(j)] and mobile station MS[α], step 625. In step 626, handover is executed between radio network controllers RNC[i] and RNC[j].

Both radio network controllers can be active as long as it is advantageous to use base stations of both radio network controllers. If all signal connections between the mobile station and base stations of a radio network controller are terminated, the radio network controller can be removed from the chain. A radio network controller can also be forced to be removed from the chain when base stations of another radio network controller offers better signal connections. In FIG. 6 the radio connection between the radio network controller RNC[i] and the mobile station is removed in step 627, and the radio network controller specific fixed connection between the radio network controller RNC[i] and base stations BS[a(i) . . . c(i)] is also removed.

FIG. 6 also shows a handover (Inter-GRAN HO) between radio network controllers belonging to two different radio networks GRAN A and GRAN B. In the case of such a handover, the dynamic configuration is repeated in the new radio network and the same procedures as in the old radio network are carried out in the new radio network, steps 631 and 632.

Arranging Communications Between Radio Network Controllers

FIG. 7 shows in closer detail a cellular system's core network CN which comprises a switching centre MSC, and a radio network GRAN connected to the core network. The radio network GRAN comprises radio network controllers aRNC and bRNC and base stations BS1 to BS4 connected to them. A terminal TE is connected by radio to the system, via the base stations. It should be noted that FIG. 7 shows only a fraction of the usual number of radio network controllers and base stations in a radio network.

FIG. 7 illustrates some embodiments of the handover according to the invention. When setting up a connection, one radio network controller is made an anchor controller, which in the case depicted by FIG. 7 also serves as active radio network controller at the initial stage of the connection. The anchor controller is here marked aRNC. The Figure shows a situation wherein a radio network controller bRNC is made the active controller during the connection.

In an embodiment of the invention the inter-RNC handover signaling messages, like other radio resource management messages within the radio access network as well as the user data, are transmitted encapsulated via the core network CN. Then the core network CN serves only as a message router and link between two radio network controllers functioning as tunnelling points. The radio network controllers know how to create and decode these messages as well as how to realise the functions requested in them. An advantage of this embodiment is that no separate physical transmission paths are needed between the radio network controllers.

In a second embodiment of the invention there exists a physical link between two radio network controllers, such as a cable or radio network connection, for example. Then the handover signaling can be transmitted direct from a radio network controller to another without participation of the core network CN. From the prior art it is known signaling between radio network controllers on protocol layers L1-L2, which, however, does not take part in the handover signaling proper.

A third embodiment of the invention relates to a situation wherein there is no continuous connection between two radio network controllers. Then a solution is applicable where one base station is connected with two network controllers. Thus a base station can actively choose which of the two radio network controllers it sends control messages to. Then a base station can also serve as a mediator between radio network controllers so that messages from a radio network controller to another travel transparently via the base station in both directions. In this case, identification codes are used to distinguish between the messages and traffic proper between the base station and radio network controller.

FIG. 8 shows a situation wherein it is needed a handover between radio network controllers of different radio networks. Then the anchor function will not remain in the old radio network but a radio network controller of the new radio network is made the anchor controller. In such a handover, the signaling between two radio networks GRAN can be carried out using an actively participating protocol, such as MAP of the GSM system, for instance. MAP will then communicate separately with the anchor radio network controllers of both GRANs and will process the signaling handover messages related to the handover, like other messages between the core network CN and radio network GRAN.

Routing Between radio Network Controllers

Let us examine a situation in which a terminal is moving in the coverage area of a radio network GRAN. The radio network anchor function then remains in the radio network controller specified for the connection, which means that all messages from the core network to the terminal are first taken to the anchor radio network controller which directs them further via other radio network controllers to the target radio network controller which delivers them to the terminal via a base station.

Use of the anchor function requires that the anchor-RNC knows how messages are transmitted to other radio network controllers of the radio network GRAN. This may be realised using a GRAN-wide address mechanism such that the anchor-RNC knows the routing to other radio network controllers, in which case a so-called fixed routing table is used. Alternatively, the radio network controller is connected to only one other radio network controller so that messages are always sent forward until a radio network controller detects from the address attached to the message that the message is addressed to it.

When using such an arrangement, it has to be taken into account that the anchor-RNC can be any one of the radio network's radio network controllers. In a small radio network it is possible to realise an embodiment of the method that employs only one anchor-RNC, common to all terminals, so that no connection-specific anchor-RNC is needed. Then the anchor-RNC functions as master and the other network controllers function as slaves. If the radio network controller can be selected, the anchor decision can be made either in the core network CN or in the radio network GRAN. Both the core network and the radio network must know which radio network controllers serve as anchors in each of the connections between the terminal TE and switching centre MSC.

FIGS. 9 and 10 show two embodiments for realising the routing between radio network controllers during different stages of connection. FIG. 9 shows an arrangement for routing the connection by means of chaining, and FIG. 10 shows an arrangement for routing the connection in an optimised manner, In FIGS. 9 and 10, circles represent radio network controllers and lines represent connections between radio network controllers, realised e.g. in one of the above-described methods according to the invention. A thick line represents active connection routing between a terminal moving in a radio network and the core network CN. Location of the terminal is only represented in the Figure by the radio network controller.

Stages A0 and B0 in FIGS. 9 and 10 represent an initial situation where the terminal communicates with the core network through radio network controllers 100 and 900. Stages A1 and B1 represent a situation where the terminal is handed over to radio network controllers 111 and 911 while the anchor remains in the old radio network controller.

The advantage of the optimised embodiment can be seen in the situation where the connection of a terminal is further handed over to either an anchor radio network controller or some other radio network controller. In stages A2 and B2 the next handover is to radio network controller 122 and 922. In the chaining method, a new communications link is simply established between the old radio network controller 921 and the new radio network controller 922. In the optimised solution, a new communications link is established between the anchor-RNC 120 and the new radio network controller (122), and the link between the anchor-RNC 120 and the old radio network controller 121 is removed.

Stages A3 and B3 illustrate a situation where the connection of the terminal has been handed over back to the anchor-RNC from the initial state of stages A2 and B2. In the optimised case, the communication link between the old radio network controller 132 and the anchor-RNC 130 is removed. Since the new radio network controller is the anchor-RNC, no new communication link needs to be established. In the traditional chaining method, a loop is made from the anchor-RNC 930 back to the anchor-RNC 930 through all the radio network controllers that the terminal has used during the connection.

Optimised handover can be carried out in two ways depending on whether it is possible to use the signaling connection with the old radio network controller during the handover. In a so-called backward handover the old radio network controller is used for signaling during the handover, and in a so-called forward handover the old radio network controller is not used for signaling during the handover. FIGS. 11 and 12 show some ways of carrying out the above-mentioned backward and forward handovers. The description to follow also refers to handover situations according to FIGS. 9 and 10. Abbreviations used in the Figures are listed in the abbreviation list that follows the description.

Backward Handover

FIG. 11 shows by way of example the signaling flow diagram of an optimised backward handover between radio network controllers. In a backward handover the old connection with the terminal is retained for the whole duration of the handover so that the radio path parameters of the new location can be transmitted to the terminal via the old radio network controller 111. In our example the terminal transits from state A1 shown in FIG. 10 to state A2, i.e. from the old radio network controller 111 to the new radio network controller 112.

An optimised backward handover according to FIG. 11 between radio network controllers comprises the following steps:

A terminal TE requiring a handover between base stations sends a message to the old radio network controller oRNC. When the old radio network controller finds that the new base station required by the terminal belongs to another radio network controller nRNC, it informs the anchor controller aRNC about the request for a backward handover.

Having received the message from the old radio network controller oRNC the anchor controller aRNC requests the new radio network controller nRNC to reserve fixed and radio connections according to the bearer information (BI) for the terminal.

Having received from the new radio network controller an acknowledge for the reservation of connections under the new radio network controller nRNC the anchor controller aRNC negotiates with the new radio network controller nRNC and they set up the user data transmission link.

Next, the anchor controller aRNC requests the old radio network controller oRNC to send the radio path information of the radio path reserved under the new radio network controller nRNC to the terminal using the old, still operational connection.

Having received from the old radio network controller oRNC an acknowledge for the sending of information of the new radio path to the terminal the anchor-RNC requests the new radio network controller to start transmission to the terminal. Finally, the anchor controller aRNC requests the old radio network controller oRNC to release the resources allocated to the terminal. This can be a forced release after the new base station set offers better signal connections, or alternatively the release can be made if none of the base stations of the network controller serves the mobile station.

Forward Handover

FIG. 12 shows by way of example the signaling flow diagram of an optimised forward handover between radio network controllers. In a forward handover it is assumed that the old connection via the old radio network controller oRNC 111 is no longer in use. In the example according to FIG. 12 a terminal transits from state A1 shown in FIG. 10 to state A2, i.e. from the old radio network controller oRNC 111 to the new radio network controller nRNC 112.

An optimised forward handover according to FIG. 12 between radio network controllers comprises the following steps:

When the terminal and/or new base station nBS find that the terminal needs a handover and the radio network controller nRNC controlling the new base station has detected that the old base station belongs to another radio network controller oRNC, the new radio network controller nRNC sends a message indicating the need for a forward handover to the old base station oRNC either directly (as in FIG. 12) or via the anchor controller aRNC.

The old radio network controller oRNC sends a request-acknowledge to the new radio network controller nRNC and informs the anchor controller about the need for a handover. Then the anchor controller aRNC and the new radio network controller nRNC negotiate and set up a dedicated user data transmission link.

Having received from the anchor controller aRNC an acknowledge to its handover request the old radio network controller releases the fixed and radio connections allocated to the terminal. At latest when the new radio network controller has the user data connections from the anchor controller aRNC up and operational will the new radio network controller nRNC establish the necessary fixed and radio connections between the base station and terminal.

Finally, the new radio network controller nRNC sends a message to the anchor controller aRNC indicating that the handover is completed.

Use of Macrodiversity Combining in Radio Network According to Invention

Used with a CDMA-type radio network, which facilitates the combining of signals from multiple base stations, or macrodiversity combining, the arrangement according to the invention is characterised by some special features. Macrodiversity combining employs multiple simultaneous connections, first, between the terminal and base station sectors and, second, between the terminal and individual base stations. On the uplink path the terminal uses one signal and one spread code which is received at several base stations. Alternatively, the terminal may use one signal with several spread codes received at several base stations. The final signal is the result of macrodiversity combination. In the downlink direction, several base stations transmit one and the same signal spread using different spread codes to a terminal that performs the macrodiversity combining. The signal connections that provide sufficient signal strength at agreed power levels belong to the so-called active set.

If the active set includes base stations connected with different radio network controllers, the macrodiversity combining can be carried out separately for each radio network controller. Then the final signal combination is completed only in the anchor-RNC. In another embodiment the signals are separately routed to the anchor-RNC where the macrodiversity combining proper is carried out. A prerequisite for each diversity combining is rough timing information, e.g. with the accuracy of 256 chips, indicating the framework within which bit-level signal combining can be performed.

Alternatively, macrodiversity combining can be carried out such that the base stations handle the chip-level timing and make the soft bit decisions. These bits, represented by a more detailed representation defined by several bits, are sent to the radio network controller where the combining is carried out using the diversity technique.

In a preferred embodiment, packet transmission can be realised in such a manner that same packets are not transmitted via two different base stations. The solution may be such that it is decided on the moment of transmission of each packet which one of the radio paths is the more advantageous one at that moment. The decision may be based e.g. on a prediction on the quality of radio connections, quality calculations or quality measurements. The advantage of macrodiversity combining is then that the better-quality radio transmission path branch is used at each time. Retransmissions caused by failed packet receptions can be further directed e.g. according to the following selection criteria for the radio transmission path branch:

retransmission uses the radio transmission path branch used in the previous transmission, retransmission uses other than the branch used in the previous transmission or retransmission uses the branch the quality of which is estimated the best.

This is to improve the probability of success through retransmission. An advantage of this embodiment is e.g. a reduced radio path load as the same data normally are not transmitted via two branches.

The active set can be limited such that it includes only the base station connections the base stations of which are connected to the same radio network controller. However, this embodiment has the disadvantage that as the terminal crosses the boundary between two radio network controllers, the macrodiversity has to be abandoned momentarily.

In an embodiment in which radio network controllers are connected only through the core network CN, macrodiversity combining is advantageously realised in the nearest radio network controller lest it be necessary to transmit unconnected signals via the CN.

If the radio network controllers are directly connected, macrodiversity combining according to the invention has two embodiments. The first embodiment covers the cases wherein macrodiversity combining is carried out in successive radio network controllers and finally in the anchor-RNC. The second embodiment covers the cases wherein all signals are separately gathered in the anchor-RNC and macrodiversity combining is carried out there. This embodiment is advantageous in a solution in which the anchor-RNC is the same for all connections in the radio network GRAN and the other radio network controllers are just routers.

Mechanisms according to the present invention easily lead to different radio network topologies. However, in the preferred embodiment the radio network is not made topologically complex but it is allowed to utilise as efficiently as possible the core network to transmit its own messages, either passively or actively. As regards the use of radio network resources, it is advantageous to retain a sufficient functional distribution because it is preferable that the radio link layers are located as close as possible to the base stations the signals of which are best detected by the terminal.

Functions According to Invention in Radio Network Controller

According to the invention, a radio network controller advantageously has the following new characteristics.
means for realising anchor functions,
means for storing information on routing to other controllers in the radio network,
means for realising data routing to the core network CN,
means for realising data routing to another radio network controller,
means for communicating with another controller, and
means for carrying out macrodiversity combining by choosing the momentarily strongest signal connection or by combining the signals of different connections.

FIG. 13 shows radio network controller functions-prior to a handover and FIG. 14 shows radio network controller functions immediately after a handover. In the situation represented by FIGS. 13 and 14, the radio network controller RNC0 is the anchor controller and the radio network controller RNC1 is active before the handover and RNC2 is active after the handover. In FIGS. 13 and 14, a thick line in the fixed network represents transmission of user data and a thin line a signaling connection. A thin line between base stations and a terminal indicates measurement operations and a serrated line, or flash symbol, indicates transmission of user data.

In addition to the anchor RNC functions (ARNCF) the anchor controller RNC0 realises the user data relay (UDR) to the active radio network controller. In the active radio network controller RNC1 there is a macrodiversity controller (MDC). The active RNC1 also includes a macrodiversity combination point (MDCP) for the uplink direction. The corresponding combination point for the downlink direction is located in the terminal TE. The active radio network controller RNC1 also contains a set controller (SC). For each terminal there is in the active radio network controller RNC1 a candidate set (CS) and, as a subset of the CS, an active set (AS).

One or more radio network controllers (RNC2) that control base stations in the immediate vicinity (handover likely) of the base station set of the active radio network controller RNC1 may control an external candidate set (ECS). The external candidate set ECS may include one or more base stations controlled by the radio network controller RNC2. The radio network controller RNC2 includes an external candidate set controller (ECSC) to control the external candidate set.

The anchor controller RNC0 or the active RNC1 (location selectable) includes a so-called set control function (SCF) that monitors the need for handover between radio network controllers, prepares the necessary external candidate set ECS and executes the handover.

An anchor controller can be established in two alternative manners:
The radio network controller RNC through which the connection was originally set up is chosen the anchor controller. Then, in principle, all radio network controllers may function as the anchor. In practice, this alternative calls for logical RNC-to-RNC connection facilities between all radio network controllers RNC in the radio network GRAN.
Within a radio network GRAN, all anchors are always established in one and the same radio network controller, so-called master-RNC, which at the same time is probably the only radio network controller connected with the core network CN. The master-RNC includes the anchor-RNC functions (ARNCF). The master-RNC facilitates a star-like topology for the connections between radio network controllers.

The examples illustrated by FIGS. 13 and 14 are based on a situation where the anchor has been selected and one active RNC is connected with it which is not an anchor-RNC.

The anchor controller RNC0 shall have a logical communications connection with both the radio network controller RNC1 and the RNC2. The physical realisation of the logical RNC-to-RNC communications connection between the radio network controllers RNC1 and RNC2 may be a direct RNC1-RNC2 link or, optionally, the communications between the radio network controllers RNC1 and RNC2 can be realised by relaying via the anchor controller RNC0.

In FIG. 13 the set control function SCF is located in the anchor controller RNC0 so that a logical connection between radio network controllers RNC1 and RNC2 is not needed. Other logical RNC-to-RNC connections can be physically realised in the three manners described above (via CN, using RNC-to-RNC cable/radio link, or via base stations). A logical RNC-to-RNC communications connection is in principle independent of the physical implementation. E.g. in optimised routing, where the logical communications connection exists between the anchor controller and the active radio network controller, the physical connection can even be relayed via previous active radio network controllers if necessary.

The anchor-RNF function ARNCF comprises tasks as follows:
Setting up logical RNC-to-RNC connections between the anchor controller and the active radio network controller,
User data relay UDR, i.e. directing the downlink data to radio network controller RNC2 and receiving the uplink data from macrodiversity combination point MDCP-up/RNC2 of the radio network controller RNC2, and
Setting up, controlling and releasing a logical connection between core network CN and radio network.

The user data relay UDR comprises tasks as follows:
Relaying traffic between a terminal TE and core network CN instead of base stations controlled by own radio network controller to another radio network controller according to instructions from the anchor-RNC function ARNCF.

The user data relay controls the user data stream directly or controls the operation of the logical link control LLC. The logical link control LLC controls the radio connections between the radio network controller and a terminal. The tasks of the logical link control LLC include error detection, error correction and retransmission in error situations. In addition, the logical link control LLC comprises control for the necessary buffers and acknowledge windows. The logical link control unit LLC has a generalised meaning; it may terminate the corresponding LLC protocol of the terminal, but it can alternatively serve as an LLC relay. In an LLC relay function the logical link control unit may terminate the messages of the radio network in a normal manner, but it relays the core network messages (core network data and signaling) further to a defined node of the core network CN. An example of this is relaying messages between a terminal and core network of the General Packet Radio Service GPRS. In this case the Serving GPRS Support Node (SGSN) would serve as a terminating unit.

The logical link control LLC can be located such that it is always in the anchor controller. Then there is no need to transmit big LLC buffers within the radio network in connection with a handover of an active radio network controller. Alternatively, the logical link control may be located always in the active radio network controller, in which case the LLC buffers have to be transferred in conjunction with a handover between radio network controllers. Possible transfer of the logical link control from a radio network controller to another is carried out under the control of the user data relay UDR in the anchor controller. The location of the logical link control in the active radio network controller is shown by dashed lines in FIGS. 13 and 14.

The user data relay UDR carries out data relaying also in cases where the role of the logical link control is small, e.g. in the so-called minimum mode, or when the logical link control has no role at all. Possible locations of the logical link control are also determined in part by the macrodiversity combining used.

Radio network controller managers create or remove, depending on the internal implementation method, terminal-specific functions (e.g. ECSC, MDC and MDCP) in the radio network controller and direct the signaling messages to the correct function in the radio network controller.

The macrodiversity combination point MDCP and macrodiversity controller MDC represent ordinary functions related to the macrodiversity implementation used. The user data relay UDR is related to inter-RNC communications within the radio network. The anchor-RNC function (ARNCF), which is active only during a handover, belongs to the disclosed anchor-based handover arrangement according to the invention. The set control function SCF, set controller SC and the external candidate set controller ECSC belong to the disclosed arrangement according to the invention that uses an external candidate set.

In a macrodiversity implementation which comprises on the uplink transmission path only one transmission in the terminal, the macrodiversity combination point MDCP/up is located in the radio network controller. On the downlink transmission path with multiple transmissions (each base station having its own) the macrodiversity combination point MDCP/down is located in the terminal.

The macrodiversity combination point MDCP and macrodiversity controller MDC perform the functions that belong to macrodiversity combining according to the macrodiversity implementation used. The functions add and remove base stations from the internal candidate set and from the active set.

Furthermore, the macrodiversity controller MDC according to the invention shall be capable of
  indicating to the set controller SC the completed additions or removals of base stations to and from the active set of base stations,
  adding to/removing from the candidate set visible to the terminal the base stations added to/removed from the external candidate set,
  producing for the set controller the necessary radio path quality reports comparable with the external candidate set controller ECSC, and
  indicating on request of the set controller SC to the terminal that an entirely new active set (former external candidate set) has been taken into use.

The set controller SC carries out tasks as follows:
Checks using the boundary base station list BBSL whether a base station added to/removed from the active set belongs to the so-called boundary base stations of a neighbour radio network controller.
Requests the set control function SCF to realise a creation/removal of an external candidate set in a neighbour radio network controller and to provide the necessary information such as the identity of the base station that triggered the request, the identity of the terminal, etc.
When the external candidate set changes, transmits via the macrodiversity controller MDC to the terminal the information needed by the terminal in the external candidate set measurement.
Provided that intense monitoring is used, produces and transmits information to the set control function SCF that is comparable with intense monitoring controlled by the external candidate set controller ECSC.
Conveys to the macrodiversity controller MDC the radio-technical parameters of the external base station set that is about to become active. The macrodiversity controller MDC sends them further to the terminal like the parameters it produced itself.
On request of the set control function SCF, terminates the operation of a terminal in its own radio network controller RNC1 or, alternatively, converts the active set of its own radio network controller to the external candidate set of the new active radio network controller RNC2.

The set control function SCF comprises tasks as follows:
On request of the set controller SC, allows/forbids, possibly negotiating with, say, the target radio network controller, the creation of an external candidate set ECS.
Requests that a neighbour radio network controller create an external candidate set for a certain terminal, transmitting the information (say, base station identity) produced by the active radio network controller to the neighbour radio network controller RNC2.
When creating or modifying an external base station set transmits to the set controller SC the data needed by the terminal in the measurement.
Receives the connection quality reports of the set controller SC and external candidate set controller and makes a handover decision based on them.
Decides on a handover to a neighbour radio network controller or on intense monitoring.
If intense monitoring is possible, requests the external candidate set controller ECSC to start intense monitoring. Requests from the macrodiversity controller the data required for intense monitoring and sends them to the external candidate set controller. Requests the macrodiversity controller to produce data comparable with the intense monitoring data produced by the external candidate set controller ECSC if said data differ from normal reference data. Receives the intense monitoring results from the external candidate set controller ECSC and compares them with the quality data received from the set controller SC.
Indicates to the external candidate set controller ECSC that the handover has been completed and receives the radio-technical parameters of the active external base station set of the external candidate set controller ECSC and sends them further to the set controller SC.

Indicates to the anchor-RNC function ARNCF that the handover has been completed between the two radio network controllers.

When the base station set of the radio network controller RNC2 has become the active set, requests the set controller SC/RNC1 of the old radio network controller RNC1 to terminate operation and to remove the rest of the functions related to the terminal from the radio network controller RNC1 or, alternatively, convert the radio network controller RNC1 into an external candidate set controller for the radio network controller RNC2.

The external candidate set controller ECSC has tasks as follows:

When starting for a given terminal it creates for the base station BS/RNC1, which triggered the preparation, a suitable external candidate set ECS based e.g. on geographic and/or propagation technical location data and, when the external candidate set ECS exists, updates it constantly according to the base stations added to/removed from the active set.

Conveys to the set control function SCF the data required for the external candidate set ECS measurement at the terminal.

In intense monitoring, on the basis of the terminal-specific information produced by the set control function, sets up in the radio network controller RNC2 the functions that are needed in the uplink quality sampling and reports the results of the sampling to the set control function SCF.

As handover starts, sends the radiotechnical parameters of the external base station set becoming active to the set control function SCF. Starts in the radio network controller RNC2 the uplink macrodiversity controller MDC/RNC2 and the macrodiversity combination point MDCP-up/RNC2 needed in the active radio network controller, using the external candidate set as the initial state for the new active set. At the same time establishes the fixed and radio connections needed by the active set.

Execution of Handover Between Radio Network Controllers

Let us consider the execution of a handover between radio network controllers in the exemplary situation depicted by FIGS. 13 and 14. Two phases can be discerned in the handover between radio network controllers:

inter-RNC handover preparation phase and
inter-RNC handover execution phase.

Handover Preparation Phase

The following example of the preparation phase assumes that the set control function SCF is in the anchor controller RNC0, so a connection between radio network controllers RNC1 and RNC2 is not needed. The preparation phase is the same in the uplink and downlink directions.

In the situation depicted in FIGS. 13 and 14 the handover preparation comprises the following steps:

First, the radio network controller RNC1 adds a base station to the active set AS. The signaling flow diagram in FIG. 15 shows one method of adding a base station to the active set. Then the set controller SC/RNC1 detects on the basis of the boundary base station list BBSL that a base station has been added to the active set which is located in the immediate vicinity of the base stations controlled by a neighbour radio network controller RNC2. The set controller SC/RNC1 sends a message about this to the set control function SCF. If this is the first such base station, the set control function SCF requests that an external candidate set controller ECSC be started in the neighbour radio network controller RNC2.

Next the radio network controller RNC2 starts the external candidate set controller ECSC for the terminal. Based e.g. on the geographic location data the external candidate set controller ECSC determines a suitable external candidate set ECS for the terminal and sends information about the base stations belonging to the external candidate set to the radio network controller RNC1 via the set control function SCF. Alternatively, if there is a direct signaling connection between the radio network controllers RNC1 and RNC2, this can be done direct to the set controller SC/RNC1. The set controller SC/RNC1 adds the external candidate set ECS to the set of base stations to be measured at the terminal. This is done controlled by the macrodiversity controller MDC/RNC1 as in the case of an internal candidate set.

After that the terminal uses e.g. pilot signals to perform usual measurements for the base station set that includes the candidate set CS and the external candidate set ECS. In this example it is assumed that the terminal makes a decision or proposition for transferring base stations between the active set and the candidate set, and the transfer can be carried out by the macrodiversity combination point MDCP and macrodiversity controller MDC. The set controller SC/RNC1 is informed about the transfer. When the macrodiversity controller MDC/RNC1 detects the request of transferring a base station belonging to an external candidate set ECS to the active set, the request is transmitted to the set controller SC/RNC1 to be further considered or to be executed.

If the only boundary base station toward the radio network controller RNC2 is removed from the active set, the set controller SC/RNC1, having detected the situation, removes the external candidate set controller ECSC from the radio network controller RNC2 by sending a removal request to the set control function SCF/RNC0, FIG. 16. The set control function SCF/RNC then conveys the request to the radio network controller RNC2 which removes the external candidate set controller ECSC. The procedure then starts over again. Otherwise the set controller (SC/RNC1) requests for external candidate set update in the radio network controller RNC2.

If the set control function SCF finds that a base station/base stations controlled by the radio network controller RNC2 give(s) a better signal, the set control function SCF may alternatively order a handover between radio network controllers RNC1 and RNC2 or only start optional intense monitoring in the radio network controller RNC2.

In intense monitoring, a preprocess MDCP' like the macrodiversity combination point is set up in the radio network controller RNC2 for the uplink transmission path, and said preprocess once in a while receives data from the terminal but does not itself transmit data further but only the connection quality report to the set control function SCF.

Having found on the basis of measurements or intense monitoring that a handover is necessary to base station(s) controlled by the radio network controller RNC2, the set control function SCF starts the execution phase of a handover between radio network controller RNC1 and radio network controller RNC2.

Handover Execution Phase

An inter-RNC handover can be carried out as follows:

The active set is completely transferred to the new radio network controller RNC2. Thus only one radio network controller is active at a time. In the handover execution phase the external candidate set ECS2 of the radio network controller RNC2 completely becomes the terminal's active set AS, and the active set AS1 and candidate set CS1 of the radio network controller RNC1 are removed. Optionally, the active set AS of the radio network controller RNC1 may remain as candidate set ECS 1. This arrangement avoids the problem of RNC synchronisation found in hierarchic combining.

In hierarchic combining, each radio network controller has an active set of its own. All active radio network controllers perform their own combining for the data in the uplink direction. Final uplink combining can be carried out in radio network controller RNC0. Then it is not necessary to establish a macrodiversity controller proper MDC/RNC0 in the radio network controller RNC0 or functions equivalent to a macrodiversity combination point MDCP-up/RNC0, if the combination points of the active radio network controllers are able to preprocess the final result for fixed transmission in such a manner that final combining is easy to perform in the radio network controller RNC0. Alternatively, one of the active radio network controllers may serve as a so-called combination anchor, combining the user data of the other active radio network controllers prior to the transmission to the radio network controller RNC0. The user data relay UDR/RNC0 has to duplicate the downlink user data for the downlink connection combined in the terminal. Additionally, the base stations of the active sets of the different radio network controllers must be synchronised as required by the CDMA method used. Hierarchic combining may comprise several hierarchy levels.

A combination of the alternatives described above is used e.g. in such a manner that the downlink direction employs complete transfer of active set and the uplink direction employs hierarchic combining. Then in the downlink direction user data are transmitted via the previous active set until measurements show that the new base station set is better. Then the downlink data will be transmitted via the new set. By means of this solution, the advantages of hierarchic combining are retained in the uplink direction but data duplicating is avoided in the downlink direction.

Following example of the execution phase of an inter-RNC handover is based on the complete transfer of the active set both in the uplink and in the downlink directions (alternative 1). The execution phase example assumes that the set control function SCF is located in the anchor controller RNC0 so that no logical RNC-to-RNC connection is needed between the radio network controllers RNC1 and RNC2. The execution phase example is based on the use of macrodiversity in a generic CDMA system. The example is illustrated by the message flow diagram in FIG. 17.

In the example discussed here the handover execution comprises the following steps after the set control function (SCF) has made the handover decision.

First, the anchor function ARNCF of the anchor controller RNC0 sets up a logical RNC-to-RNC connection between the anchor controller RNC0 and the new active radio network controller RNC2. Then the set control function SCF informs the radio network controller RNC2 about the execution of the handover. The external candidate set controller ECSC sends to the set control function SCF or, alternatively, direct to the old set controller SC/RNC1 the radiotechnical parameters of the active-to-be base station set to be further transmitted to the terminal. Internal operation of the radio network controller RNC2 is mostly the same as in conjunction with the set-up of a normal call with the difference that the external candidate set is immediately made the final active set. Instead of an external candidate set, a set controller SC/RNC2, macrodiversity controller MDC/RNC2 and macrodiversity combination point MDCP/RNC2 are established for the uplink direction. Controlled by the radio network controller RNC2 it is reserved or created terminal-specific fixed bearers needed for user data transmission between the radio network controllers and the base stations in the active set as well as radio bearers between base stations and the terminal in manners used in the radio network unless such connections have already been completely created in intense monitoring of the preparation phase.

On request of the set control function SCF the user data relay UDR in the anchor-RNC function ARNCF modifies its operation as follows. The user data relay UDR prepares to receive the uplink user data from the macrodiversity combination point MDCP-up/RNC2 of the radio network controller RNC2. The user data relay UDR directs the downlink user data also to the radio network controller RNC2.

Next, the set control function SCF/RNC2 sends to the set controller SC/RNC1 of the radio network controller RNC1 the parameters (such as the time reference and the scrambling and/or spreading code used) of the pilot signals of the base stations in the active set of the radio network controller RNC2. The set controller SC/RNC1 in the radio network controller RNC1 sends to the terminal the parameters of the new active set.

Then the macrodiversity combination point MDCP/RNC2 in the radio network controller RNC2 starts transmission with the new active set AS/RNC2. This is acknowledged to the anchor-RNC function ARNCF via the set control function SCF.

Finally, the anchor function ARNCF may request the radio network controller RNC1 to remove the terminal's set controller SC/RNC1, macrodiversity controller MDC/RNC1 and macrodiversity combination point MDCP/RNC1 as well as to release the terminal-specific fixed bearers between the radio network controllers and base stations and possible remaining radio path reservations. Alternatively, the anchor controller may request the radio network controller RNC1 to turn the active set of the radio network controller RNC1 into an external candidate set ECS. This having been acknowledged, the inter-RNC handover is completed.

In the examples discussed above it is assumed that the frequency of the external candidate set ECS complies with re-use 1, typical of a CDMA system, so that the external candidate set has the same frequency as the candidate set proper. It is however possible to establish an external candidate set at another frequency. Then, the active set AS of only one candidate set can be in use. Even if macrodiversity combining were not an advantageous solution between different frequencies, this embodiment still facilitates the change from candidate set AS to new candidate set AS' in accordance with the principles set forth above.

Applications of Invention

The present invention can be used in connection with a great number of applications. These include e.g. database search services, data downloading, video conferencing, "on demand" data purchases from a communications network, use of world wide web services in the Internet including web browsing etc.

The embodiments discussed above are naturally exemplary and do not limit the invention. For example, the terminal may comprise a mobile station, portable terminal or a fixed terminal, such as the terminal of a cordless subscriber connection.

Particularly it should be noted that the creation of an external candidate set for an inter-RNC handover can be carried out independently of whether data communications will be routed to the new active base station via another radio network controller, such as an anchor controller.

The steps of the above-described method according to the invention can also be carried out in an order other than that given above and some steps may be skipped as unnecessary.

Above it was discussed embodiments wherein the radio network employs the CDMA system. However, it should be noted that the present invention is in no way limited to the CDMA system but it can be utilised in other systems as well, such as the TDMA system, for example.

List of Abbreviations used in Figures and Description
CN Core Network
GRAN Generic Radio Access Network
TDMA Time Division Multiple Access
CDMA Code Division Multiple Access
TE Terminal Equipment
BS Base Station
nBS new Base Station
oBS old Base Station
BSC Base Station Controller
RNC Radio Network Controller
nRNC new Radio Network Controller
oRNC old Radio Network Controller
aRNC anchor Radio Network Controller
aRNCF anchor Radio Network Controller Function
bRNC active Radio Network Controller which is not anchor RNC
UDR User Data Relay
CS Candidate Set
AS Active Set
ECS External Candidate Set
ECSC External Candidate Set Controller
MDC MacroDiversity Controller
SC Set Controller
SCF Set Control Function
BBSL Boundary Base Station List
MDCP MacroDiversity Combination Point
RI Radiopath Information
BI Bearer Information
ID IDentity
HO HandOver
ack acknowledge
up uplink
down downlink
req request
resp response

The invention claimed is:

1. A method comprising
providing a plurality of base stations interconnected via a plurality of radio network controllers wherein the radio network controllers are in communication with a mobile switching center of a communications system,
establishing a radio communications connection between the communications system and a terminal via an active one of said base stations and one of said radio network controllers that serves as an anchor radio network controller, the communication being with a spread code signal,
directing communications connection to said anchor radio network controller via a second of said radio network controllers, and
employing in the communications system macrodiversity combining so that said second radio network controller includes a macrodiversity combination point and a spread code signal combination is carried out in a chain of radio network controllers in which said anchor and said second radio network controllers serve as transmission links, and a final signal combination is completed in said anchor controller.

2. The method of claim 1, wherein there is a selection of the anchor radio network controller, or anchor controller, through which the data communication of said connection occurs for the duration of the connection, and communication with possible other active radio network controller is directed via said anchor controller.

3. The method of claim 2, wherein said selection is carried out specifically for the connection when setting up the connection.

4. The method of claim 2, wherein said selection is carried out in conjunction with system configuration.

5. The method of claim 2, wherein communication is directed frown the anchor controller to new radio network controllers established during the connection by means of chaining.

6. The method of claim 2, wherein the number of radio network controllers used in data communication is minimized by determining a new route between the anchor controller and a new active radio network controller so that the previous active radio network controller is bypassed.

7. The method of claim 6, wherein the handover between radio network controllers is a backward-type handover where signaling during the handover is directed via the old radio network controller.

8. The method of claim 6, wherein the handover between radio network controllers is a forward-type handover where signaling during the handover is directed via the new radio network controller.

9. The method of claim 2, wherein the communications system uses macrodiversity combining so that the spread code combination is carried out in said anchor controller.

10. The method of claim 1, wherein prior to a handover between radio network controllers an external candidate set is established and a candidate set of the new active radio network controller is established on the basis of said external candidate set.

11. The method of claim 1, wherein a handover between radio network controllers comprises a preparation phase and an execution phase.

12. The method of claim 11, wherein said preparation phase includes adding a base station to an active set.

13. The method of claim 11, wherein said execution phase includes changing the active radio network controller and the active base station set.

14. The method of claim 11, wherein said execution phase includes keeping at least two radio network controllers and their base station sets active.

15. The method of claim 1, wherein the active radio network controller and base station set are completely transferred.

16. The method of claim 1, wherein the radio network used for the communication is an UMTS network.

17. A communication system comprising
a mobile switching center, a first and a second radio network controller in communication with the mobile switching center, and base stations connected to the radio network controllers to provide a communications connection between the system, which employs communication with a spread code signal, and a terminal connected with it, one of said radio network controllers serving as an amchor radio network controller, the system being configured to direct the communications connection to an active one of said radio network controllers via another one of said radio network controllers; and uses macrodiversity combining so that said second radio network controller includes a macrodiversity combination point and a spread code signal combination is carried out in a chain of radio network controllers formed by a plurality of said radio network controllers serving as transmission links, and a final signal combination is completed in said anchor controller.

18. The communication system of claim 17, the system further being configured to select one of the controllers to be the anchor controller, and direct the data communication of said connection to a possible other active radio network controller via said anchor controller.

19. The communication system of claim 17, the system further being configured to create an external candidate set prior to a handover between radio network controllers and create a new candidate set based on said external candidate set.

20. A radio network controller being configured to route communication, operative with a macrodiversity signal combination, to a second radio network controller during a connection, said radio network controller and second radio network controller belonging top a commuication system, which comprises a plurality of radio network controllers in communication with a mobile switching center and which employs communication by a spread code signal, and combine macrodiversity spread code signals independently or together with said second radio network controller via a chain of the radio network controllers so that said second radio network controller includes a macrodiversity combination point, one of the radio network controllers in the chain being an anchor controller, and wherein a final signal combination is completed in said anchor controller.

21. The radio network controller of claim 20, the radio network controller further being configured to store information about routing to other radio network controllers.

22. The radio network controller of claim 20, the radio network controller further being configured to send and receive encapsulated handover messages to and from another radio network controller via the core network of a cellular network.

23. The radio network controller of claims 20, the radio network controller further being configured to send and receive handover messages and user data to and from another radio network controller via a physical connection, such as a cable or radio link, between two radio network controllers.

24. The radio network controller of claim 20, the radio network controller further being configured to transparently send and receive handover messages and user data to and from another radio network controller via a base station that is connected with both said radio network controllers.

25. The radio network controller of claim 20, the radio network controller further send and receive handover messages and user data to and from another radio network controller via the core network of a cellular system by independently communicating with the active protocol of the core network.

26. The radio network controller of claim 20, the radio network controller further being configured to realize an anchor function.

27. The radio network controller of claim 26, wherein the anchor function realization comprises logical inter-RNC connections creation between the anchor controller and the active radio network controller.

28. The radio network controller of claim 26, the radio network controller further being configured to relay user data to another radio network controller on the basis of direction by said means for realizing an anchor function.

29. The radio network controller of claim 20, the radio network controller further being configured to controll data communication between a radio network controller and a terminal by a logical link control unit.

30. The radio network controller of claim 29, the radio network controller further being configured to controll and terminate messages of the logical link control unit between the terminal and the radio network controller.

31. The radio network controller of claim 30, the radio network controller further being configured to controll and terminate first messages of the logical link control unit between the terminal and the radio network controller and means for relaying second messages between the terminal and the core network.

32. The radio network controller of claim 29, the radio network controller further being configured to relay messages of the logical link control unit between the terminal and the core network.

33. The radio network controller of claim 20, the radio network controller further being configured to controll a logical link control unit of a stone or another radio network controller.

34. The radio network controller of claim 20, the radio network controller further being configured to realize a set control function.

35. The radio network controller of claim 20, wherein said macrodiversity spread code signal combination comprises a selection of the momentarily strongest transmission connection.

36. The radio network controller of claim 20, wherein said macrodiversity spread code signal combination comprises a signal production by combining the signals of at least two transmission paths.

37. The radio network controller of claim 20, the radio network controller further being configured to select in packet transmission a radio path separately for each packet transmission.

38. The radio network controller of claim 37, the radio network controller further being configured to select precisely one radio path for each packet transmission.

39. The radio network controller of claim 20, further comprising a macrodiversity controller.

40. The radio network controller of claim 20, the radio network controller further being configured to data encryption or access control scramble in a radio network controller that is an anchor and/or is in active mode.

41. A radio network controller being configured to route data communication related to a communication connection between a base station and a second radio network controller of a chain of radio network controllers comprising said radio network controller, wherein the chain of controllers further includes a radio network controller serving as an anchor controller, wherein the chain of radio network controllers uses macrodiversity combining so that said second radio network controller includes a macrodiversity combination point and a spread code signal combination is carried out in said chain of radio network controllers, and a final signal combination is completed in said anchor controller.

42. The radio network controller of claim 41, the radio network controller further being configured to establish an external candidate set.

43. The radio network controller of claim 42, the radio network controller further being configured to create a boundary base station list and establish an external candidate set on the basis of said boundary base station list.

44. The radio network controller of claim 42, the radio network controller further being configured to turn an external candidate set into a candidate set.

45. The radio network controller of claim 41, the radio network controller further being configured to control communication between a radio network controller and a terminal by a logical link control unit.

46. The radio network controller of claim 41, further comprising a set controller.

47. The radio network controller of claim 41, further comprising an external candidate set controller.

48. A radio network controller being configured to
route communication to a second radio network controller of a chain of radio network controllers comprising said radio network controller during a connection, said chain of radio network controllers including a network controller that serves as an anchor radio network controller,
create a boundary base station list,
establish an external candidate set on the basis of said boundary base station list, and
control communication between the radio network controller and a terminal by a logical link control unit based on said boundary base station list, wherein said second radio network controller includes a macrodiversity combination point and a final signal combination is completed in said anchor controller.

49. The radio network controller of claim 48, the radio network controller further being configured to turn an external candidate set into a candidate set.

50. The radio network controller of claims 48, further comprising a set controller.

51. The radio network controller of claims 48, further comprising an external candidate set controller.

52. A method
providing a plurality of base stations interconnected via a plurality of radio network controllers in a chain of radio network controllers, wherein the plurality of radio network controllers are in communication with a mobile switching center of a mobile switching center,
establishing a radio communications connection between the communications system and a terminal via an active one of said base stations and one of said radio network controllers that serves as an anchor radio network controller, the communication being with a spread code signal,
directing the communications connection to said anchor radio network controller via a second of said radio network controllers, wherein said second radio network controller includes a macrodiversity combination point, and prior to a handover between radio network controllers, an external candidate set is established and a candidate set of a new active radio network controller is established on the basis of said external candidate set, a final signal combination is completed in said anchor controller; and
wherein a handover between radio network controllers comprises a preparation phase and execution phase.

53. A method comprising
establishing a radio communications connection between a communications system having a plurality of radio network controllers in communication with a mobile switching center and a terminal via an active one of said radio network controllers and an active base station,
establishing an external candidate set of base stations in preparation for a handover, directing user data to a second of said radio network controllers which serves as an anchor controller in a chain of the radio network controllers, said second radio network controller including a macrodiversity combination point, and
directing communications connection to said active radio network controller and a further active radio network controller via said anchor controller, wherein a final signal combination is completed in said anchor controller.

54. A method comprising
establishing a radio communications connection between a communications system, which comprises multiple radio network controllers in a chain of the network controllers and groups of base stations associated with respective ones of the radio network controllers, and a mobile terminal via a first one of said radio network controllers and a first one of said base stations, wherein a controller of said chain of network controllers serves as an anchor controller, said radio network controllers being in communication with each other and with their respective base stations by use of a spread code signal;
prior to a handover of said mobile terminal between a base station of said first radio network controller and a base station of another of said radio network controllers, establishing for communication with the mobile terminal a candidate set of base stations and a candidate set of at least one of the radio network controllers associated with the base stations of the candidate set of base stations;
selecting, from said candidate sets, a base station and a radio network controller associated therewith; and
for implementing the handover, directing the communications connection to the selected radio network controller via the first radio network controller, wherein communication among a plurality of said radio network controllers is carried out by macrodiversity combining with the spread code signal in the chain of radio network controllers serving as transmission links, wherein said selected radio network controller includes a macrodiversity combination point, and a final signal combination is completed in said anchor controller.

55. A method comprising
providing a plurality of base stations interconnected via a plurality of radio network controllers wherein the radio network controllers are in communication with a mobile switching center of a communications system,
establishing a radio communications connection between the communications system and a terminal via an active one of said base stations and one of said radio network controllers that serves as an anchor radio network controller, the communication being with a spread code signal
directing communications connection to said anchor radio network controller via a second of said radio network controllers,
employing in the communications system macrodiversity combining so that said second radio network controller includes a macrodiversity combination point and a spread code signal combination is carried out in a chain of radio network controllers in which said anchor and said second radio network controllers serve as transmission links, and a final signal combination is completed in said anchor controller, and providing data encryption or access control scrambling in a radio network controller that is an anchor and/or is in active mode.

56. A communication system comprising a mobile switching center, a first and a second radio network controller in communication with the mobile switching center, and base stations connected to the radio network controllers to provide a communications connection between the system, which employs communication with a spread code signal, and a terminal connected with it, one of said radio network controllers serving as an anchor radio network controller, the system being configured to direct the communications connection to an active one of said radio network controllers via another one of said radio network controllers;

data encryption or access control scrambling in a radio network controller that is an anchor and/or is in active mode, and use macrodiversity combining so that said second radio network controller includes a macrodiversity combination point and a spread code signal combination is carried out in a chain of radio network controllers formed by a plurality of said radio network controllers serving as transmission links, and a final signal combination is completed in said anchor controller.

57. A radio network controller being configured to route communication, operative with a macrodiversity signal combination, to another radio network controller during a connection, said radio network controller and another radio network controller belonginh to a communication system, which comprises a plurality of radio network controllers in communication with a mobile switching center and employs communication by a spread code signal, combine macrodiversity spread code signals independently or together with said another radio network controller in a chain of the radio network controllers so that said another radio network controller includes a macrodiversity combination point, one of the radio network controllers in the chain being an anchor controller, and wherein a final signal combination is completed in said anchor controller, and data encrypt or access control scramble in the radio network controller that is an anchor and/or is in active mode.

58. A radio network controller being configured to route data communication related to a communication connection between a base station and another radio network controller of a chain of radio network controllers including said radio network controller, wherein one of the radio network controlleres of the chain of controllers serves as an anchor controller, wherein the chain of radio network controllers uses macrodiversity combining, said another radio network controller includes a macrodiversity combination point, a spread code signal combination is carried out in said chain of radio network controllers, and a final signal combination is completed in said anchor controller; and data encrypt or access control scramble in a radio network controller that is an anchor and/or is in active mode.

59. A radio network controller being configured to route communication to another radio network controller of a chain of radio network controllers including said radio network controller during a connection, said chain of radio network controllers including a network controller that serves as an anchor radio network controller, create a boundary base station list, means for establishing an external candidate set on the basis of said boundary base station list, data encrypt or access control scramble in a radio network controller that is an anchor and/or is in active mode, and control communication between the radio network controller and a terminal by a logical link control unit based on said boundary base station list, wherein the communication system employs macrodiversity combining, said another radio network controller includes a macrodiversity combination point, a spread code signal combination is carried out in the chain of radio network controllers in which two of said radio network controllers including said anchor controller serve as transmission links, and a final signal combination is completed in said anchor controller.

60. A method comprising providing a plurality of base stations interconnected via a plurality of radio network controllers (RNCs) in a chain of RNCs, wherein the plurality of radio network controllers are in communication with the mobile switching center of a communications system, establishing a radio communications connection between the communications system and a terminal via an active one of said base stations and one of said radio network controllers that serves as an anchor radio network controller, the communication being with a spread code signal directing the communications connection to said anchor radio network controller via a second of said radio network controllers of the chain, wherein prior to a handover between radio network controllers, an external candidate set is established and a candidate set of a new active radio network controller is established on the basis of said external candidate set, employing in the communication macrodiversity combining so that said second radio network controller includes a macrodiversity combination point, said anchor and said second radio network controllers serving as transmission links of the chain, and a final signal combination is completed in said anchor controller;

providing for data encryption or access control scrambling in a radio network controller that is an anchor and/or is in active mode, and wherein a handover between radio network controllers comprises a preparation phase and execution phase.

61. A method comprising establishing a radio communications connection between a communications system having a plurality of radio network controllers in communication with a mobile switching center and a terminal via an active one of said radio network controllers and an active base station, establishing an external candidate set of base stations in preparation for a handover, directing user data to a second of said radio network controllers which serves as an anchor controller in a chain of the radio network controllers, providing data encryption or access control scrambling in a radio network controller that is an anchor and/or is in active mode, directing communications connection to said active radio network controller and a further active radio network controller via said anchor controller, and employing in the communications system macrodiversity combining so that said active radio network controller includes a macrodiversity combination point and a spread code signal combination is carried out in the chain of radio network controllers in which said anchor and said active radio network controllers serve as transmission links, and wherein a final signal combination is completed in said anchor controller.

62. A method comprising establishing a radio communications connection between a communications system, which comprises multiple radio network controllers in a chain of the network controllers and groups base stations associated with respective ones of the radio network controllers, and a mobile terminal via a first one of said radio network controllers and a first one of said base stations, wherein a controller of said chain of network controllers serves as an anchor controller, said radio network controllers are in communication with each other and with their respective base stations by use of a spread code signal;

providing data encryption or access control scrambling in a radio network controller that is an anchor and/or is in active mode;

prior to a handover of said mobile terminal between a base station of said first radio network controller and a base station of another of said radio network controllers, establishing for communication with the mobile terminal a candidate set of base stations and a candidate set of at least one of the radio network controllers associated with the base stations of the candidate set of base stations;

selecting, from said candidate sets, a base station and a radio network controller associated therewith; and for implementing the handover, directing the communications connection to the selected radio network controller via the first radio network controller, wherein communication among a plurality of said radio network controllers is carried out by macrodiversity combining, said selected radio network controller including a macrodiversity combination point with the spread code signal in the chain of radio network controllers serving as transmission links, and a final signal combination is completed in said anchor controller.

* * * * *

UNITED STATES PATENT AND TRADEMARK OFFICE
CERTIFICATE OF CORRECTION

PATENT NO. : 7,454,210 B2
APPLICATION NO. : 10/407289
DATED : November 18, 2008
INVENTOR(S) : Rinne et al.

It is certified that error appears in the above-identified patent and that said Letters Patent is hereby corrected as shown below:

In column 22, line 66, in claim 17, delete "amchor" and insert --anchor--, therefor.

In column 23, line 4, in claim 17, delete "uses" and insert --use--, therefor.

In column 23, line 27, in claim 20, delete "top" and insert --to--, therefor.

In column 23, line 27-28, in claim 20, delete "commuication" and insert --communication--, therefor.

In column 24, line 10, in claim 29, delete "controll" and insert --control--, therefor.

In column 24, line 14, in claim 30, delete "controll" and insert --control--, therefor.

In column 24, line 18, in claim 31, delete "controll" and insert --control--, therefor.

In column 24, line 21, in claim 31, delete "means for relaying" and insert --relay--, therefor.

In column 24, line 28, in claim 33, delete "controll" and insert --control--, therefor.

In column 24, line 53-54, in claim 40, delete "encryption" and insert --encrypt--, therefor.

In column 25, line 41, in claim 52, after "method" insert --comprising--.

In column 27, line 20, in claim 56, delete "encryption" and insert --encrypt--, therefor.

In column 27, line 34, in claim 57, delete "belonginh" and insert --belonging--, therefor.

In column 27, line 55, in claim 58, delete "controlleres" and insert --controllers--, therefor.

In column 28, line 4, in claim 59, delete "means for establishing" and insert --establish--, therefor.

In column 28, line 22, in claim 60, after "controllers" delete "(RNCs)".

UNITED STATES PATENT AND TRADEMARK OFFICE
CERTIFICATE OF CORRECTION

PATENT NO.         : 7,454,210 B2
APPLICATION NO.    : 10/407289
DATED              : November 18, 2008
INVENTOR(S)        : Rinne et al.

It is certified that error appears in the above-identified patent and that said Letters Patent is hereby corrected as shown below:

In column 28, line 23, in claim 60, before "wherein" delete "RNCs," and insert --radio network controllers,--, therefor.

In column 28, line 24, in claim 60, delete "the" and insert --a--, therefor.

In column 28, line 34, in claim 60, delete "chain,l" and insert --chain--, therefor.

In column 29, line 12, in claim 62, delete "controlers" and insert --controllers--, therefor.

In column 29, line 13, in claim 62, after "groups" insert --of--.

Signed and Sealed this

Third Day of February, 2009

JOHN DOLL
*Acting Director of the United States Patent and Trademark Office*